US011809951B2

(12) United States Patent
Deng et al.

(10) Patent No.: US 11,809,951 B2
(45) Date of Patent: Nov. 7, 2023

(54) GRAPHIC CODE PROCESSING METHOD, APPARATUS, AND DEVICE, AND MEDIUM

(71) Applicant: Tencent Technology (Shenzhen) Company Limited, Shenzhen (CN)

(72) Inventors: Ailu Deng, Shenzhen (CN); Shu-Hui Chou, Shenzhen (CN); Liqiang Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/049,885

(22) Filed: Oct. 26, 2022

(65) Prior Publication Data

US 2023/0073621 A1    Mar. 9, 2023

Related U.S. Application Data

(63) Continuation of application No. PCT/CN2021/119690, filed on Sep. 22, 2021.

(30) Foreign Application Priority Data

Oct. 9, 2020    (CN) .......................... 202011074742.0

(51) Int. Cl.
*G06K 7/14* (2006.01)
*G06K 19/06* (2006.01)

(52) U.S. Cl.
CPC ......... *G06K 7/1443* (2013.01); *G06K 7/1417* (2013.01); *G06K 19/06037* (2013.01)

(58) Field of Classification Search
CPC .. G06K 7/1404; G06K 7/1439; G06K 7/1443; G06K 7/1426; G06K 7/1417; G06K 19/06037
See application file for complete search history.

(56) References Cited

U.S. PATENT DOCUMENTS

2015/0278569 A1* 10/2015 Zolotov ............. G06K 7/10732
                                                235/455
2021/0126806 A1*  4/2021 Jang .................... G06V 10/762
2021/0368335 A1* 11/2021 Wang .................... H04W 12/02

FOREIGN PATENT DOCUMENTS

CN        106875181 A        6/2017
CN        110516495 A       11/2019
CN        110674662 A  *     1/2020
(Continued)

OTHER PUBLICATIONS

International Search Report and Written Opinion received for Application No. PCT/CN2021/119690 dated Nov. 26, 2021 (English and Chinese languages) (12 pages).

*Primary Examiner* — Laura A Gudorf
(74) *Attorney, Agent, or Firm* — Crowell & Moring, LLP

(57) ABSTRACT

Graphic code processing includes displaying a graphic code scanning interface that is used for previewing at least one frame of acquired scanning image. In response to n graphic codes being included in the at least one frame of scanning image, recognition is performed on the n graphic codes to obtain n contact accounts. A service processing interaction region is displayed that includes contact controls corresponding to the n contact accounts. The service processing interaction region is configured to provide a service corresponding to at least one contact account in the n contact accounts. The n contact accounts can be obtained by scanning codes in batches to add friends and transmit files.

20 Claims, 22 Drawing Sheets

(56) References Cited

FOREIGN PATENT DOCUMENTS

| | | |
|---|---|---|
| CN | 110674662 A | 1/2020 |
| CN | 111476566 A | 7/2020 |
| CN | 111507122 A | 8/2020 |
| CN | 111553673 A | 8/2020 |
| EP | 3 361 419 A1 | 8/2018 |

\* cited by examiner

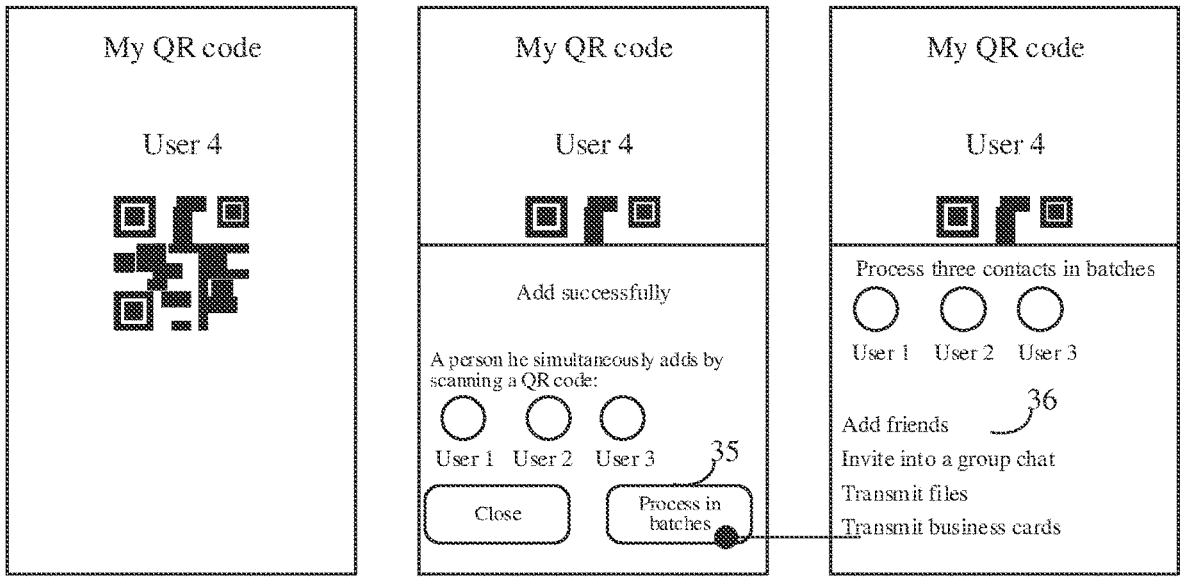

FIG. 26

| In response to n graphic codes being included on a first scanning image in at least one frame of scanning image, perform region segmentation on the first scanning image to obtain image regions corresponding to the n graphic codes | 204a |

↓

| Respectively perform recognition on graphic codes in each image region to obtain n contact accounts | 204b |

FIG. 27

| Splice at least two frames of scanning images to obtain a spliced scanning image | 204-1 |

↓

| Perform region segmentation on the spliced scanning image to obtain image regions corresponding to n graphic codes | 204-2 |

↓

| Respectively perform recognition on graphic codes in each image region to obtain n contact accounts | 204-3 |

FIG. 28

GRAPHIC CODE PROCESSING METHOD, APPARATUS, AND DEVICE, AND MEDIUM

RELATED APPLICATION

This application claims priority to PCT Application No. PCT/CN2021/119690, filed on Sep. 22, 2021, entitled "GRAPHIC CODE PROCESSING METHOD, APPARATUS, AND DEVICE, AND MEDIUM" which claims priority to Chinese Patent Application No. 202011074742.0, entitled "GRAPHIC CODE PROCESSING METHOD, APPARATUS, AND DEVICE, AND MEDIUM" and filed on Oct. 9, 2020, which is incorporated herein by reference in its entirety.

FIELD OF THE TECHNOLOGY

Embodiments of this application relate to the field of data processing, and in particular, to a graphic code processing method, apparatus, and device, and a medium.

BACKGROUND OF THE DISCLOSURE

A common two-dimensional code is a quick response (QR) code, which records data symbol information by using black and white graphs distributed on a plane (in a two-dimensional direction) according to a specific rule by using a specific geometric figure. The QR code has been widely used in various usage scenarios of mobile terminals.

Using scanning the QR code to add a friend as an example, an instant messaging program a displays a QR code business card of a user A. An instant messaging program b displays a QR code scanning interface and starts a camera. After the camera acquires the QR code business card of the user A, the instant messaging program b extracts personal information of the user A from the QR code business card of the user A, and adds the user A as a friend according to the personal information of the user A.

In scenarios such as a party or a meeting, the instant messaging program b may need to add many users as friends, and the instant messaging program b needs to respectively scan a QR code business card of each user to complete a friend adding process, which is cumbersome.

SUMMARY

Embodiments of this application provide a graphic code processing method, apparatus, and device, and a medium. n contact accounts may be simultaneously obtained in a graphic code scanning process, and services such as adding friends and transmitting files to all or part of the n contact accounts are performed, thereby improving the graphic code processing efficiency. The technical solutions are as follows:

According to an embodiment of this application, a graphic code processing method is provided, performed by a terminal, and the method including:

displaying a graphic code scanning interface, the graphic code scanning interface being used for previewing at least one frame of acquired scanning image;

obtaining n contact accounts in response to n graphic codes recognized in the at least one frame of scanning image, where n is an integer greater than 1; and displaying a service processing interaction region, the service processing interaction region including contact controls corresponding to the n contact accounts, and the service processing interaction region being used for providing a service corresponding to at least one contact account in the n contact accounts.

According to another embodiment of this application, a graphic code processing apparatus is provided, including:

a display module, configured to display a graphic code scanning interface, the graphic code scanning interface being used for previewing at least one frame of acquired scanning image;

a recognition module, configured to obtain n contact accounts in response to n graphic codes recognized in the at least one frame of scanning image, where n is an integer greater than 1; and the display module being further configured to display a service processing interaction region, the service processing interaction region including contact controls corresponding to the n contact accounts, and the service processing interaction region being used for providing a service corresponding to at least one contact account in the n contact accounts.

According to another embodiment of this application, a computer device is provided, including a processor and a memory, the memory storing at least one instruction, at least one program, a code set, or an instruction set, the at least one instruction, the at least one program, the code set, or the instruction set being loaded and executed by the processor to implement the graphic code processing method according to the foregoing embodiment.

According to another embodiment of this application, a computer-readable storage medium is provided, storing at least one instruction, at least one program, a code set, or an instruction set, the at least one instruction, the at least one program, the code set, or the instruction set being loaded and executed by a processor to implement the graphic code processing method according to the foregoing embodiment.

According to another embodiment of this application, a computer program product is provided, storing at least one instruction, at least one program, a code set, or an instruction set, the at least one instruction, the at least one program, the code set, or the instruction set being loaded and executed by a processor to implement the graphic code processing method according to the foregoing embodiment.

The technical solutions provided in the embodiments of this application produce at least the following beneficial effects:

n contact accounts are obtained in response to recognition being performed on n graphic codes of at least one frame of scanning image, and then a service processing interaction region configured to provide services corresponding to the at least one contact account is displayed. The n contact accounts can be simultaneously obtained in a graphic code scanning process, and services such as adding friends and transmitting files to all or part of the contacts in the n contact accounts are performed, thereby improving the graphic code processing efficiency by the terminal.

BRIEF DESCRIPTION OF THE DRAWINGS

FIG. 26 is a schematic diagram of an interface of a graphic code processing method according to an example embodiment of this application.

FIG. 27 is a flowchart of a graphic code processing method according to an example embodiment of this application.

FIG. 28 is a flowchart of a graphic code processing method according to an example embodiment of this application.

DESCRIPTION OF EMBODIMENTS

To make the objectives, technical solutions, and advantages of this application clearer, the following further describes embodiments of this application in detail with reference to the accompanying drawings.

Figure 1:
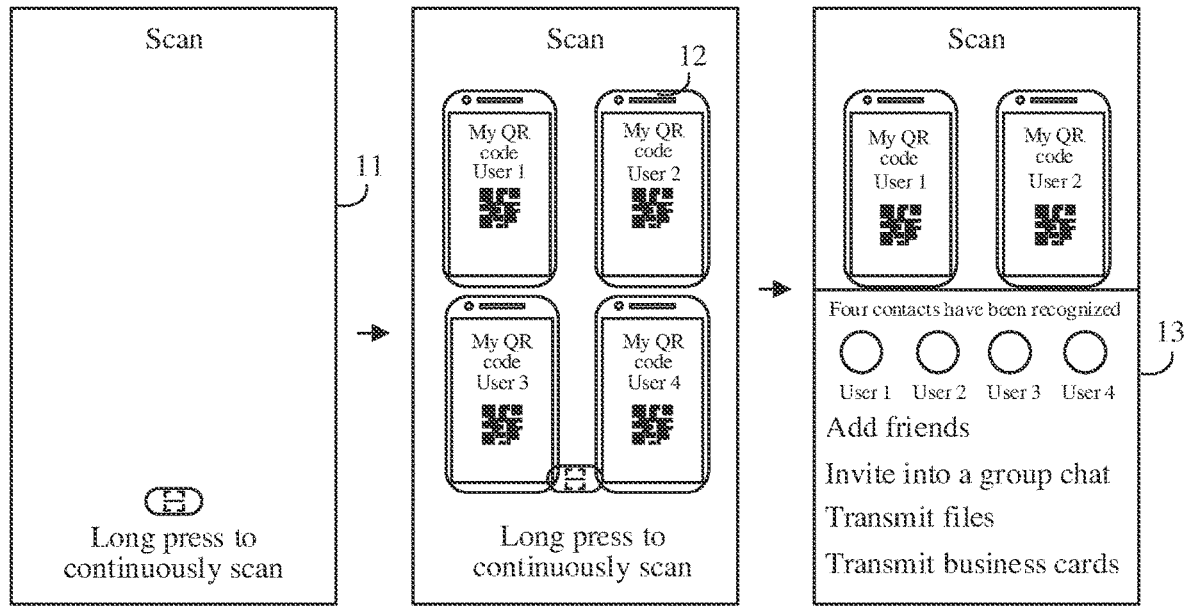
FIG. 1 is a schematic diagram of an interface of a graphic code processing method according to an exampleexample embodiment of this application.

Embodiments of this application provide a technical solution for scanning quick response (QR) codes in batches to establish a social relationship chain and to process multi-person affairs. For example, referring to FIG. 1, a user 1 to a user 5 meet for the first time in scenarios such as a party, a meeting, or school. The user 1 to a user 4 open an account QR code of an instant messaging program or a social program in their smart phone for display, and place the four smart phones on the same table. The user 5 opens a graphic code scanning interface 11 of the instant messaging program or the social program in his smart phone. The user 5 controls the camera on the smart phone to aim at the four smart phones of the user 1 to the user 4. A scanning image acquired by the camera is displayed on the graphic code scanning interface 11, and there are four QR codes 12 in the scanning image. The instant messaging program or the social program of the user 5 recognizes contact accounts (also referred to as accounts) corresponding to the user 1 to the user 4 from the four QR codes 12, and displays a service processing interface 13. The service processing interface 13 provides four types of functions: avatar check boxes of the user 1 to the user 4 and four service controls. The four service controls include: a friend adding control, a group chat inviting control, a file transmitting control, and a business card transmitting control. The user 5 can check avatars of the user 1 to the user 4, and then click the friend adding control to enter a friend adding interface on which the user 1 to the user 4 are added as friends, until friend adding is completed.

Figure 2:
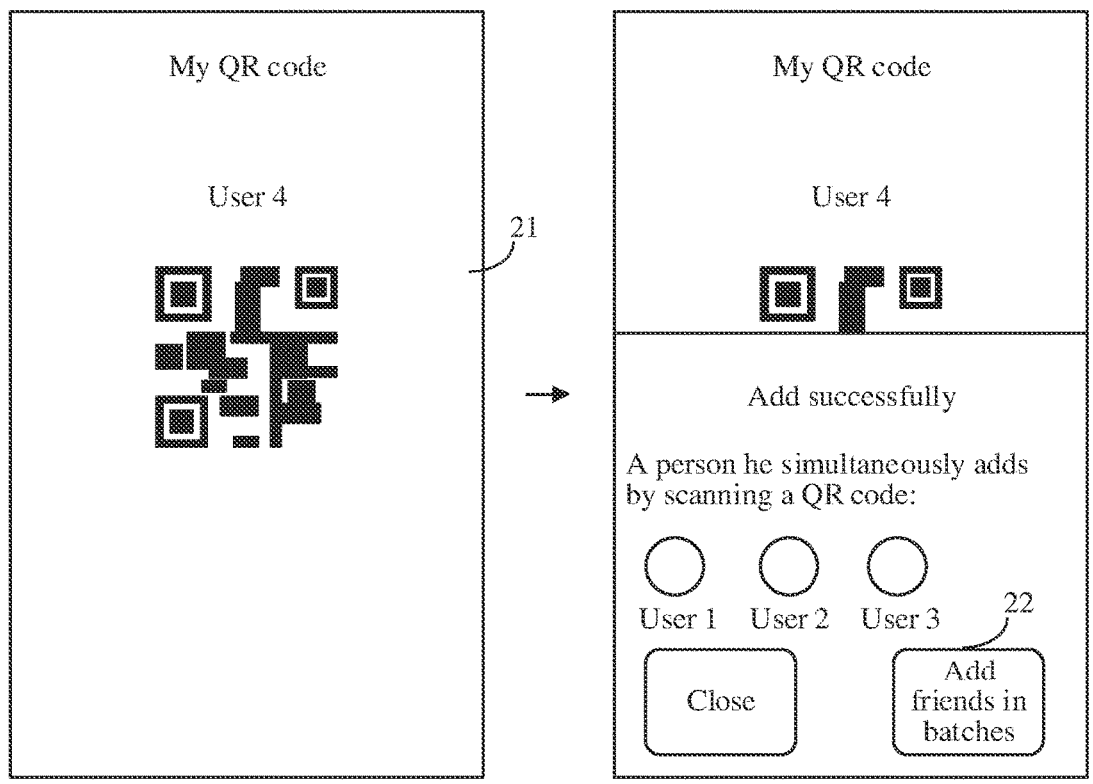
FIG. 2 is a schematic diagram of an interface of a graphic code processing method according to an example embodiment of this application.

For any one of the user 2 to the user 5, the user can also quickly add several other users as friends. Using the user 4 as an example, for example, referring to FIG. 2, the smart phone of the user 4 displays the account QR code on a user interface 21. After the user 5 and the user 4 successfully add each other as friends, the smart phone of the user 4 displays an adding success message, avatar check boxes of the user 1 to the user 3, and a friend adding control 22 in batches. The user 4 can check avatars of the user 1 to the user 4 on the smart phone, and then click the friend adding control 22.

In the following embodiments of this application, a description is made by using an example in which the user simultaneously adds a plurality of friends by using the instant messaging program.

Figure 3:
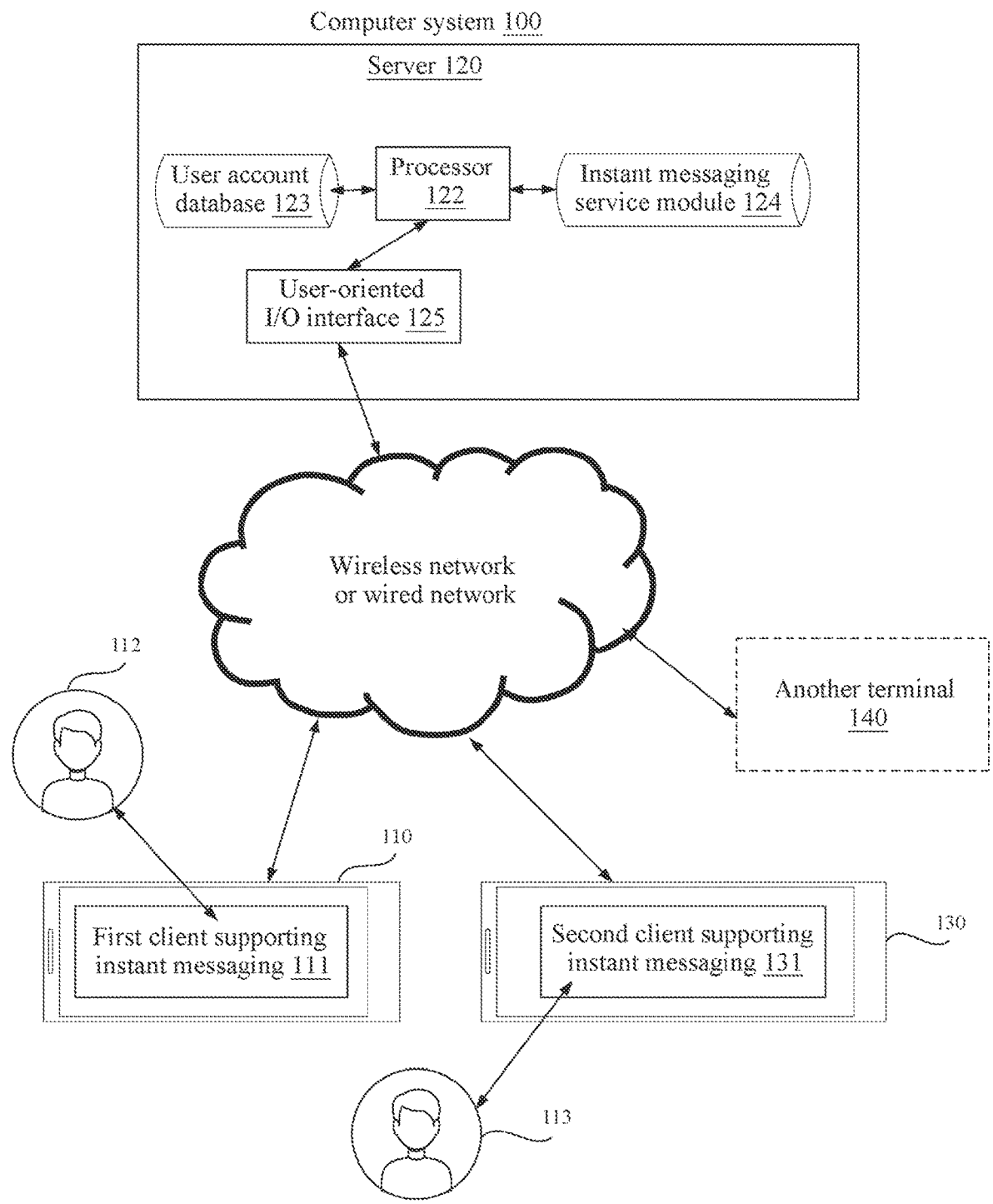
FIG. 3 is a block diagram of a computer system according to an example embodiment of this application.

FIG. 3 is a structural block diagram of a computer system according to an example embodiment of this application. The computer system 100 includes: a first terminal 110, a server 120, and a second terminal 130.

A first client 111 supporting instant messaging is installed and run on the first terminal 110, and the first client 111 may be an application or a web client with an instant messaging function. When the first terminal 110 runs the first client 111, a user interface of the first client 111 is displayed on a screen of the first terminal 110. The application may be any one of an instant messaging program, a microblog program, a voice calling program, a conference program, a network community program, a payment program, a shopping program, a dating program, a marriage program, a game program, an online education program, or another social program. In this embodiment, a description is made by using an example in which the application is an instant messaging program. The first terminal 110 is a terminal used by a first user 112, and a first user account of the first user 112 is logged in to a first client 111.

A second client 131 supporting instant messaging is installed and run on a second terminal 130, and the second client 131 may be an application or a web client with an instant messaging function. When the second terminal 130 runs the second client 131, a user interface of the second client 131 is displayed on a screen of the second terminal 130. The application may be any one of an instant messaging program, a microblog program, a voice calling program, a conference program, a network community program, a payment program, a shopping program, a dating program, a marriage program, a game program, an online education program, or another social program. In this embodiment, a description is made by using an example in which the application is an instant messaging program. The second terminal 130 is a terminal used by a second user 132, and a second user account of the second user 132 is logged in to the second client 131.

In some embodiments, applications installed on the first terminal 110 and the second terminal 130 are the same, or the applications installed on the two terminals are the same type of applications on different operating system platforms (Android or IOS). The first terminal 110 may include one of a plurality of terminals, and the second terminal 130 may include another one of the plurality of terminals. In this embodiment, only the first terminal 110 and the second terminal 130 are used as an example for description. The first terminal 110 and the second terminal 130 are of the same device type or of different device types. The device type includes at least one of a smartphone, a smart TV, a smart in-vehicle device, a wearable device, a tablet computer, an e-book reader, a Moving Picture Experts Group Audio Layer III (MP3) player, a Moving Picture Experts Group Audio Layer IV (MP4) player, a laptop, and a desktop computer.

FIG. 3 shows only two terminals. However, a plurality of other terminals 140 may access the server 120 in different embodiments. In some embodiments, one or more terminals 140 are terminals corresponding to a developer. A developing and editing platform for the client supporting instant messaging is installed on the terminal 140. The developer may edit and update the client on the terminal 140 and transmit an updated application installation package to the server 120 by using a wired or wireless network. The first terminal 110 and the second terminal 130 may download an application installation package from the server 120 to update the client.

The first terminal 110, the second terminal 130, and the another terminal 140 are connected to the server 120 through a wireless network or a wired network.

The server 120 includes at least one of one server, a plurality of servers, a cloud computing platform, and a virtualization center. The server 120 is configured to provide a backend service for a client supporting three-dimensional instant messaging. In some embodiments, the server 120 is responsible for primary computing work, and the terminal is responsible for secondary computing work; or the server 120 is responsible for secondary computing work, and the terminal is responsible for primary computing work; or a distributed computing architecture is adopted between the server 120 and the terminal to perform collaborative computing.

In an example example, the server 120 includes a processor 122, a user account database 123, a battle service module 124, and a user-oriented input/output (I/O) interface 125. The processor 122 is configured to load instructions stored in the server 121, and process data in the user account database 123 and the instant messaging service module 124; the user account database 123 is configured to store data of user accounts used by the first terminal 110, the second terminal 130, and another terminal 140, such as an avatar of the user account, a nickname of the user account, a group to which the user account belongs, or the like; the instant messaging service module 124 is configured to provide a plurality of chat rooms (two-person chat or multi-person chat) for the user to perform instant messaging chatting, transmit emoticons, transmit red packets, or transmit files; and the user-oriented I/O interface 125 is configured to establish communication exchange data with the first terminal 110 and/or the second terminal 130 by using a wireless network or a wired network.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The graphic code processing method provided in this embodiment of this application is described with reference to the foregoing description of the implementation environment, and a description is made by using an example in which an execution entity of the method is the client running on the terminal shown in FIG. 3. A client is run on the terminal, and the client is an application supporting instant messaging.

Figure 4:
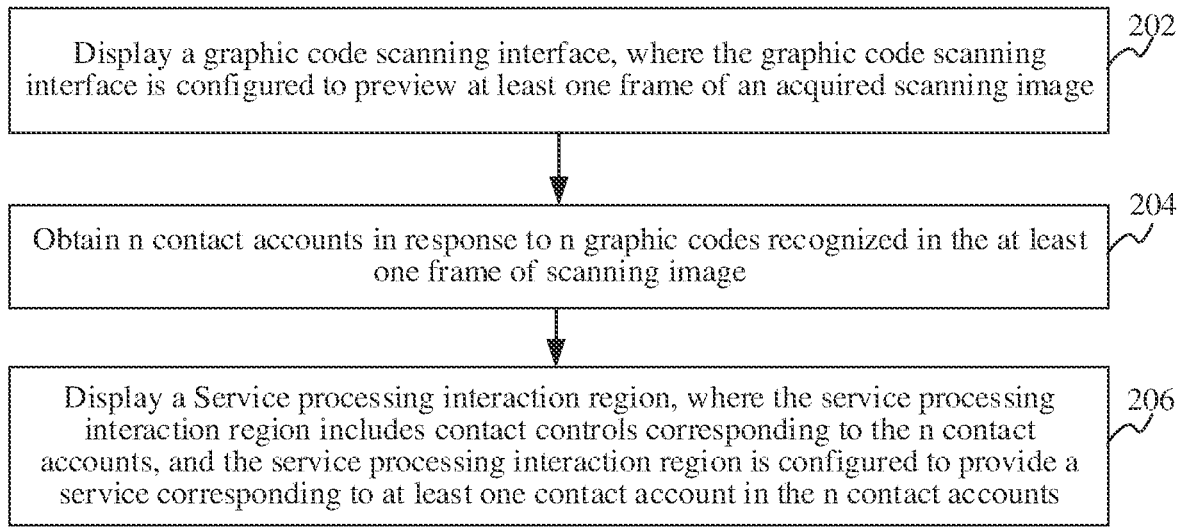
FIG. 4 is a flowchart of a graphic code processing method according to an example embodiment of this application.

FIG. 4 is a flowchart of a graphic code processing method according to an example embodiment of this application. In this embodiment, a description is made by using an example in which the execution entity of the method is the terminal shown in FIG. 1. The terminal is a computer device with a built-in or external camera, and the method includes the following steps.

Step 202. Display a graphic code scanning interface, where the graphic code scanning interface is used for previewing at least one frame of acquired scanning image; and the client running on the terminal has the capability to scan the graphic code. The graphic code may be at least one of a barcode, a QR code, and a three-dimensional code, and a description is made by using the QR code as an example in this application. The client is logged in with a local logged-in account. For example, the local logged-in account is a first account.

After a function of scanning a graphic code is enabled, the client displays the graphic code scanning interface and turns on the camera. The client obtains at least one frame of scanning image (or referred to as a scanning image sequence) acquired by the camera. The at least one frame of scanning image is an image acquired by the camera according to a frame acquisition rate. The client displays the at least one frame of scanning image on the graphic code scanning interface for preview.

The client caches the most recent scanning image or a plurality of scanning images. For example, when the graphic code is not recognized in the scanning image, the most recent scanning image is cached; and in another example, when the graphic code is recognized in the most recent plurality of scanning images, the most recent plurality of scanning images are cached In some embodiments, an album control is further displayed on the graphic code scanning interface, and the user can also click the album control to open an album interface, and select one or more images captured before from the album interface as the scanning image.

In some embodiments, an auxiliary frame line is further displayed on the graphic code scanning interface, and the auxiliary frame line is configured to assist the user to aim at the to-be-scanned graphic code, or the auxiliary frame line is configured to assist the client to recognize the graphic code.

In an optional embodiment, the user can edit the auxiliary frame line on the graphic code scanning interface, for example, increase the quantity of auxiliary frame lines and adjust a size of the auxiliary frame line, so that the auxiliary frame line displayed on the graphic code scanning interface is close to actual requirements. For example, when the user needs to simultaneously scan four graphic codes, the client can display four auxiliary frame lines on the graphic code scanning interface in response to a user operation, and causes the four auxiliary frame lines to respectively frame four graphic codes in response to the user operation, so that the client more accurately recognizes the graphic code located at the position based on the position of the auxiliary frame line.

Step 204. Obtain n contact accounts in response to n graphic codes recognized in the at least one frame of scanning image, where n is an integer greater than 1, where the n graphic codes are located on the same frame of scanning image, or the n graphic codes are located on different frames of scanning images. When the n graphic codes are located on different frames of scanning images, there are at least two graphic codes located on the same frame of scanning image, or the scanning images on which each graphic code is located are different.

Each graphic code corresponds to a contact account. The graphic code can be the graphic code displayed by other clients, or the graphic code printed or printed by the user. For example, information carried in the graphic code includes: a contact account, or the contact account and other information. The other information includes: at least one of an official website address of an instant messaging program, a nickname of a contact, an avatar of the contact, a signature of the contact, and gender of the contact.

The client performs recognition on the n graphic codes in the scanning image to obtain n contact accounts. In some embodiments, all the n contact accounts are in a stranger relationship with the local logged-in account, or some of the n contact accounts are in a friend relationship with the local logged-in account, and the other n contact accounts are in a stranger relationship with the local logged-in account.

The local logged-in account is an account logged in in the client.

In an optional embodiment, n contact accounts are obtained in response to m graphic codes recognized in the at least one frame of scanning image, where n is an integer greater than 1 and less than m, and m is an integer greater than 1; and that is, in the plurality of graphic codes recognized by the client, some graphic codes are graphic codes of the contact accounts, and the other graphic codes are other graphic codes.

Step 206. Display a service processing interaction region, where the service processing interaction region includes contact controls corresponding to the n contact accounts, and the service processing interaction region is configured to provide a service corresponding to at least one contact account in the n contact accounts.

The service processing interaction region may be a separate interface, an interface region on the graphic code scanning interface, or an interface region superimposed on the graphic code scanning interface.

In some embodiments, the client switches and displays the graphic code scanning interface as a service processing interaction region (or referred to as a service processing interface). Alternatively, the client updates and displays a part of the region on the graphic code scanning interface as the service processing interaction region. Alternatively, the client uses the service processing interaction region as a window, which is superimposed and displayed on an upper layer of the graphic code scanning interface. When the service processing interaction region is superimposed on the upper layer of the graphic code scanning interface, the service processing interaction region can block an overlapping region on the graphic code scanning interface, or can semi-transparently display the overlapping region on the graphic code scanning interface. For example, the service processing interaction region is superimposed and displayed on the upper layer of the graphic code scanning interface in the form of a half-screen floating layer.

The contact control corresponding to each contact account is configured to display contact information, and the contact information includes at least one of: a contact account, an avatar of the contact, a nickname of the contact, a signature of the contact, and gender of the contact.

The service includes one or more functions provided by the client, and specific content of the service is determined by a program type of the client, which is not limited in this application and may vary in different embodiments. In some embodiments, the service is a service of conducting network social activities with all or part of the n contact accounts.

In summary, in the method provided in this embodiment, n contact accounts are obtained in response to recognition being performed on n graphic codes of at least one frame of scanning image, and then a service processing interaction region configured to provide services of the at least one contact account is displayed. The n contact accounts can be simultaneously obtained in a graphic code scanning process, and services such as adding friends and transmitting files to all or part of the contacts in the n contact accounts are performed, thereby improving the graphic code processing efficiency by the terminal.

Figure 5:
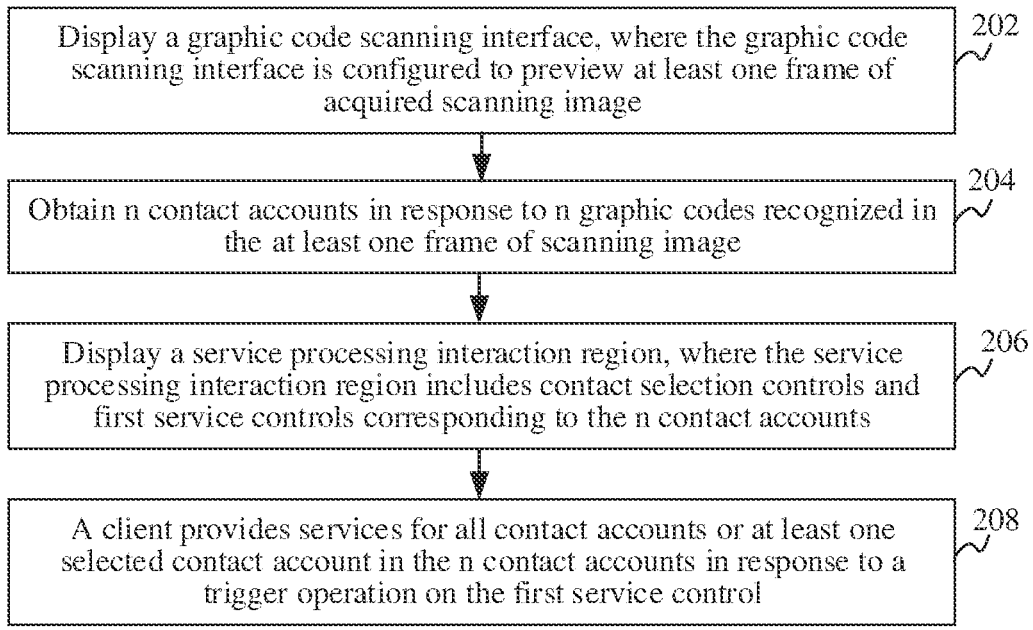
FIG. 5 is a flowchart of a graphic code processing method according to an example embodiment of this application.

In an optional embodiment based on FIG. 4, the service processing interaction region includes a first service control. The method further includes step 208, as shown in FIG. 5.

Step 208. The client provides services corresponding to all contact accounts or at least one selected contact account in the n contact accounts in response to a trigger operation on the first service control.

The selected contact account may be selected by the user operation, or may be selected by the client. In some embodiments, the user can select the contact account by triggering the contact control corresponding to the contact account. For example, a friend adding request is transmitted to the n contact accounts in response to a trigger operation on the first service control. In another example, the friend adding request is transmitted to a contact manually selected by the user in the n contact accounts in response to the trigger operation on the first service control. In another example, the client automatically transmits the friend adding request to a contact account that is not added as a friend in the n contact accounts in response to the trigger operation on the first service control.

The client provides services for all contact accounts or at least one selected contact account in the n contact accounts, including at least one of the following four embodiments:

Services corresponding to all contact accounts in the n contact accounts are provided in response to a trigger operation on the first service control.

In a possible design, the client provides the services corresponding to all the contact accounts in the n contact accounts by default.

The service corresponding to a contact account selected by the user operation is provided in response to a trigger operation on the n contact controls.

Figure 6:
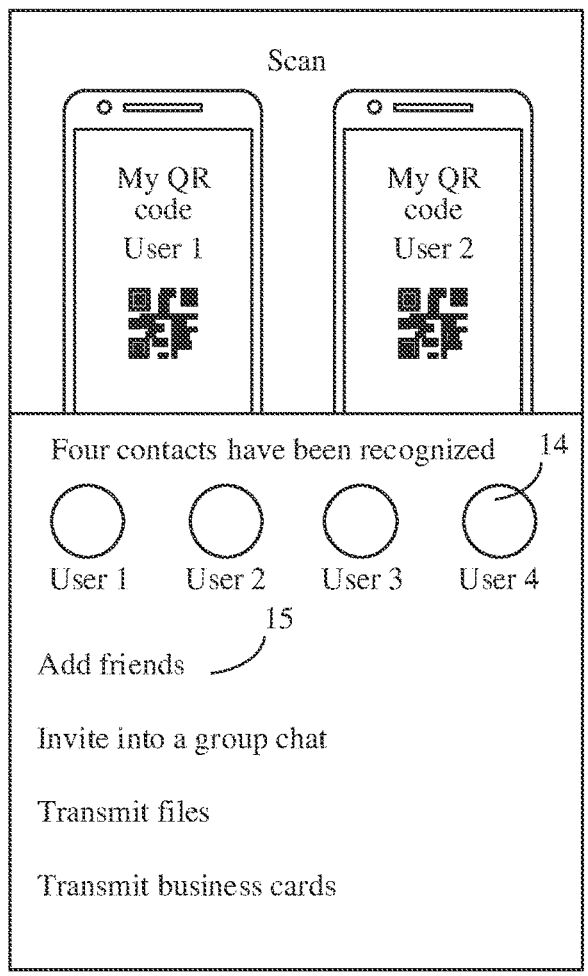
FIG. 6 is a schematic diagram of an interface of a graphic code processing method according to an example embodiment of this application.

In a possible design, the contact controls are controls selecting or deselecting the contact accounts. For example, referring to FIG. 6, at least one of the avatar of the contact and the nickname of the contact is displayed on the contact control 14, and all or part of the region of the contact control 14 can be selected. For example, the contact control 14 includes a check box at the upper right of the avatar of the contact. In an initial state, each contact control 14 may be in a selected state by default, and the user deselects one or more contact accounts through a user operation. Alternatively, in an initial state, each contact control 14 may be in a deselected state by default, and the user selects one or more contact accounts through a user operation.

There may be one or more than two contact accounts selected by the user operation.

A service corresponding to a contact account that is not added as a friend in the n contact accounts is provided in response to a trigger operation on the first service control.

In a possible design, the client automatically filters out a contact account that is not added as a friend in the n contact accounts, and provides a service corresponding to the contact account that is not added as a friend. There may be one or more than two contact accounts that are not added as friends.

A service corresponding to a contact account that meets a screening condition in the n contact accounts is provided in response to a trigger operation on the first service control.

In a possible design, the screening condition is set or selected by the user, and the screening condition includes at least one of gender, age, place of birth, occupation, and geographic location. The client automatically filters out a contact account that meets the screening condition in the n contact accounts, and provides a service corresponding to the contact account that meets the screening condition. There may be one or more than two contact accounts that meet the screening condition.

Using the client as an instant messaging program as an example, the service includes but is not limited to at least one of: adding friends, inviting into a group chat, transmitting files, transmitting business cards, creating multi-person to-do items, creating a multi-person vote, and inviting into an online class.

The service includes: adding friends.

Figure 7:
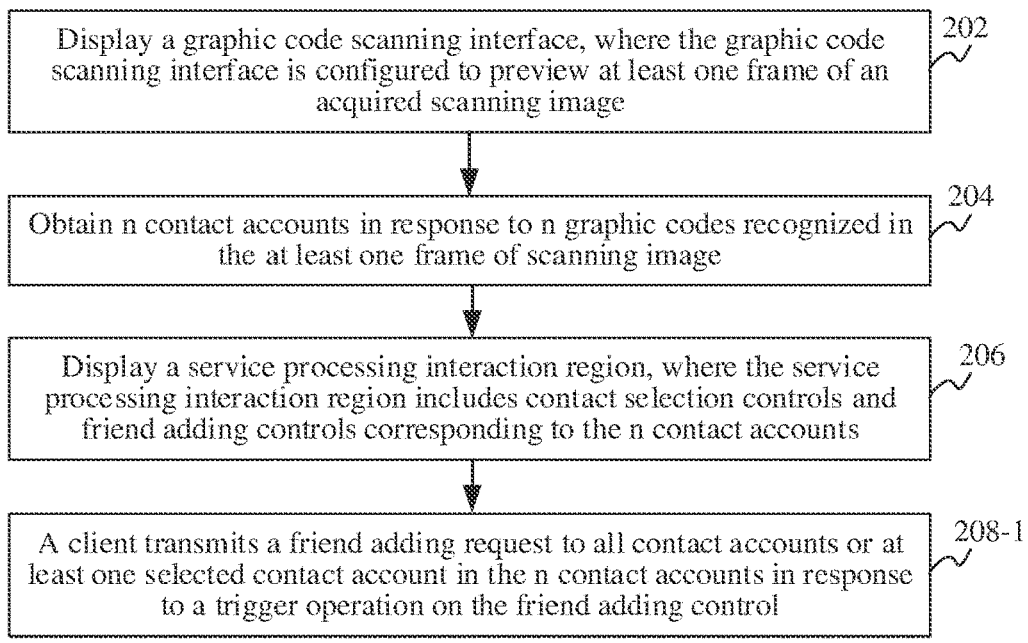
FIG. 7 is a flowchart of a graphic code processing method according to an example embodiment of this application.

The first service control includes a friend adding control. That is, the first service control is the friend adding control, or the friend adding control is one of a plurality of first service controls, or the friend adding control is a sub control of the first service control. The step 208 includes step 208-1, as shown in FIG. 7:

Step 208-1. The client transmits a friend adding request to all the contact accounts or the at least one contact account in the n contact accounts in response to the trigger operation on the friend adding control.

The trigger operation includes at least one of a click operation, a double-click operation, a long-press operation, a sliding operation, a floating touch operation, a pressure touch operation, an eye gaze operation, a voice control operation, a motion sensing operation, and a gesture operation. For example, the trigger operation is an operation directly or indirectly triggered on the friend adding control.

Figure 8:
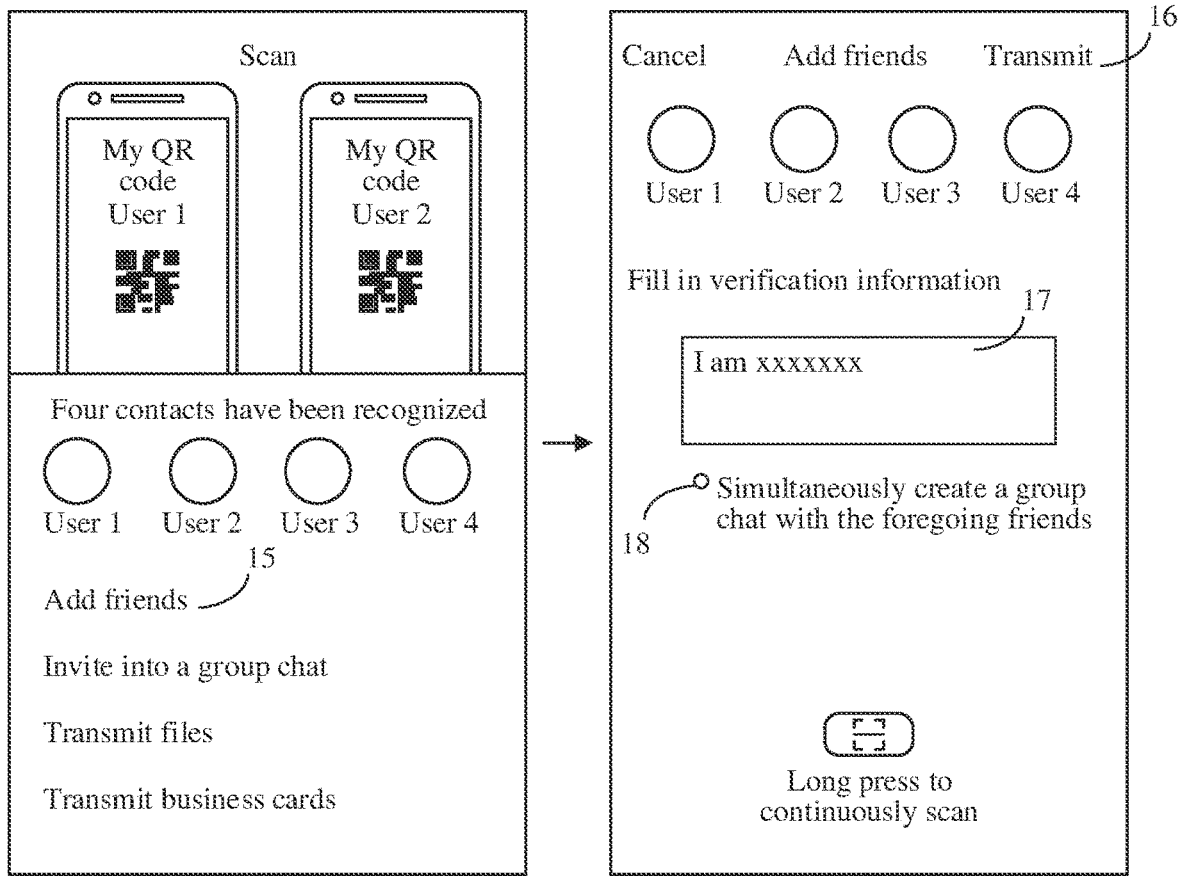
FIG. 8 is a schematic diagram of an interface of a graphic code processing method according to an example embodiment of this application.

For example, referring to FIG. 8, the user clicks the friend adding control 15, and the client displays the friend adding interface. The friend adding interface includes a transmitting control 16 and a verification information filling region 17. The verification information filling region 17 can automatically fill in default verification information, or verification information can be customized by the user. After the user clicks the transmitting control 16, the client transmits a friend adding request to all contact accounts or at least one selected contact account in the n contact accounts.

In some embodiments, the client directly transmits a friend adding request to all the contact accounts or the at least one contact account in the n contact accounts in response to the trigger operation on the friend adding control, and there is no need to manually fill in the verification information and manually click the transmitting control.

In another possible design, the client transmits a friend adding request to all the contact accounts or the at least one contact account in the n contact accounts and displays a chat interface in response to the trigger operation on the friend adding control, where the chat interface is an interface of a local logged-in account conducting a chat session with all the contact accounts or the at least one contact account in the n contact accounts.

When transmitting the friend adding request, the client automatically creates a chat session between the local logged-in account and all the contact accounts or the at least one contact account in the n contact accounts. When there is one selected contact account, the chat session is a two-person chat session, and when there are a plurality of selected contact accounts, the chat session is a multi-person group chat session.

Figure 9:
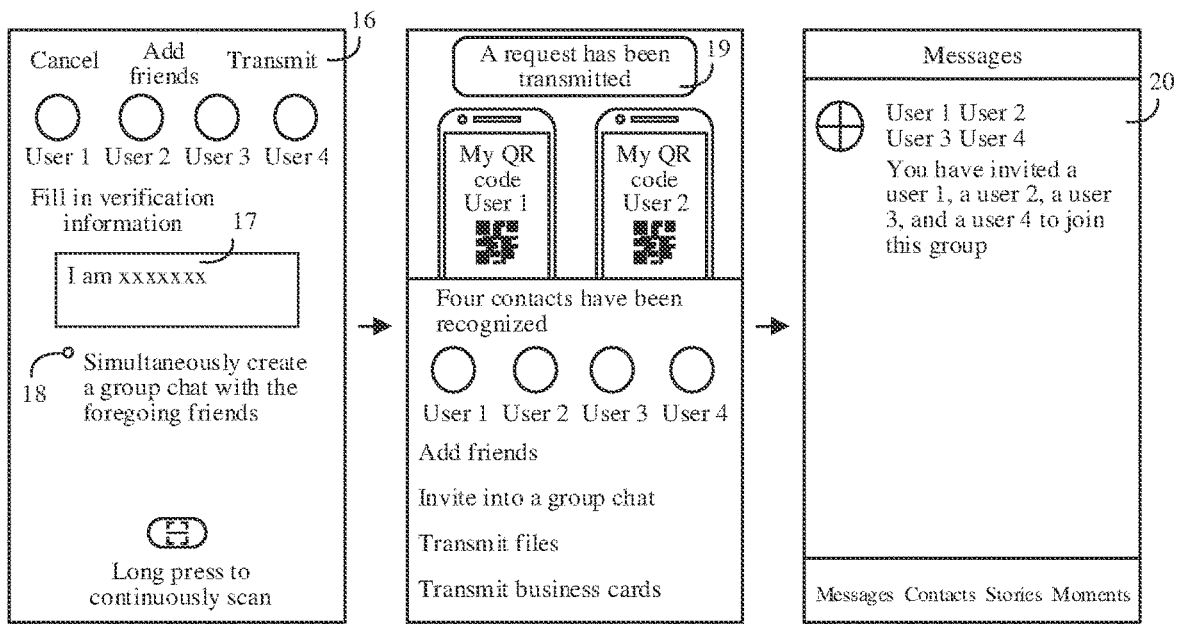
FIG. 9 is a schematic diagram of an interface of a graphic code processing method according to an example embodiment of this application.

In some embodiments, whether to create a chat session can also be customized by the user. For example, referring to FIG. 9, a "Simultaneously creating a group chat with the foregoing friends" control 18 is displayed on the friend adding interface. The user first checks the control 18 "Simultaneously creating a group chat with the foregoing friends", and then clicks the transmitting control 16. The client creates a chat session between the local logged-in account and all the contact accounts or the at least one contact account in the n contact accounts. On the one hand, prompt information 19 "A request has been transmitted" is popped up on the client, and on the other hand, after manually returning to a message list page, the user can see a newly created group chat 20.

In summary, in the method provided in this embodiment, by scanning the graphic codes of a plurality of contact accounts in batches, friends can be quickly added in batches, steps performed during adding friends a plurality of times are reduced, and the graphic code processing efficiency by the terminal is improved.

In the method provided in this embodiment, when transmitting the friend adding request, the client creates a chat session between the local logged-in account and all the contact accounts or the at least one contact account in the n contact accounts. The terminal does not need to process a plurality of graphic codes in a plurality of times, thereby improving the processing efficiency of the terminal.

The Service includes: Inviting into a Group Chat.

Figure 10:
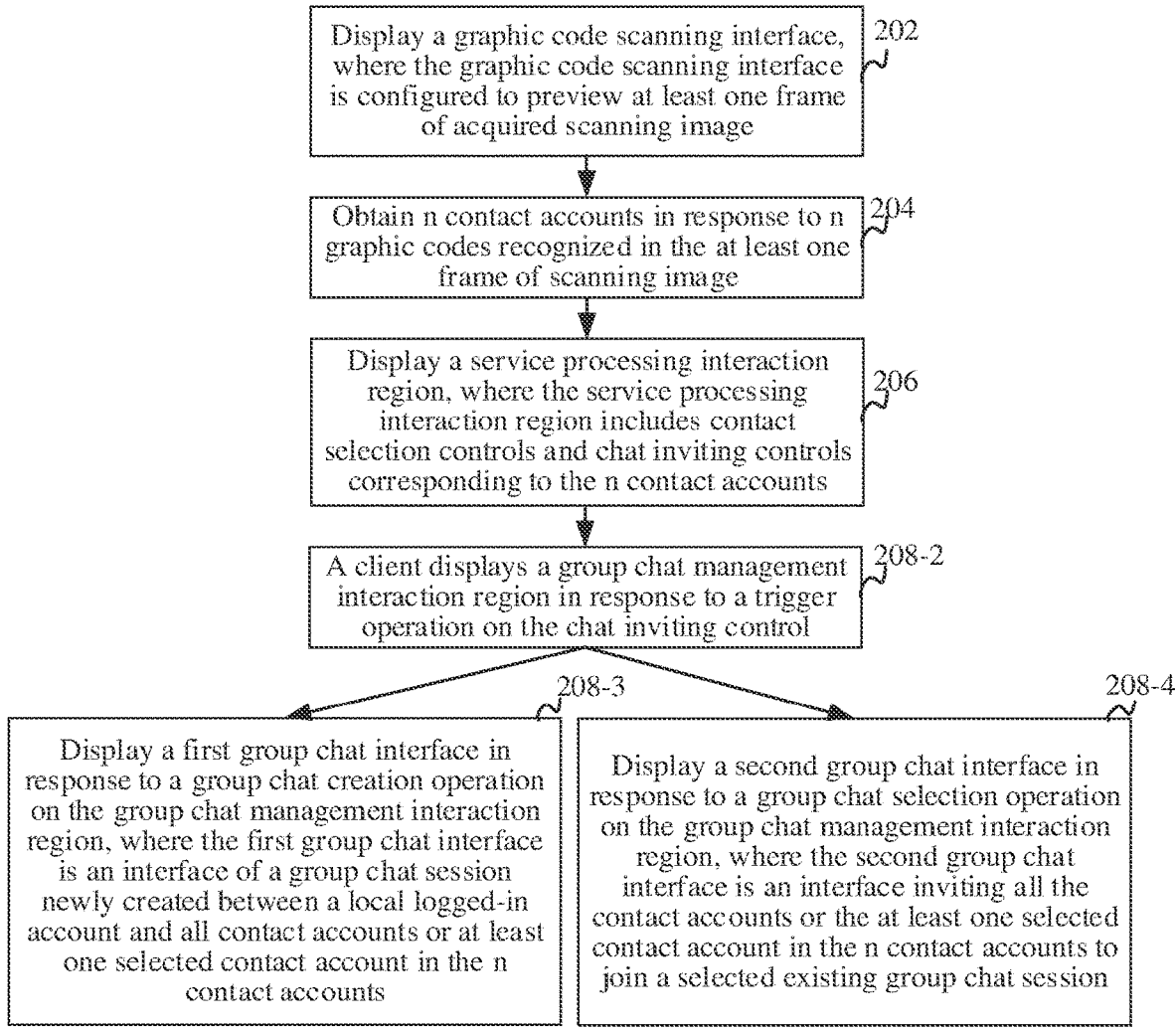
FIG. 10 is a flowchart of a graphic code processing method according to an example embodiment of this application.

The first service control includes a group chat inviting control. That is, the first service control is the group chat inviting control, or the group chat inviting control is one of a plurality of first service controls, or the group chat inviting control is a sub control of the first service control. The step 208 includes step 208-2 and step 208-3, as shown in FIG. 10:

Step 208-2. The client displays a group chat management interaction region in response to the trigger operation on the group chat inviting control.

The trigger operation includes at least one of a click operation, a double-click operation, a long-press operation, a sliding operation, a floating touch operation, a pressure touch operation, an eye gaze operation, a voice control operation, a motion sensing operation, and a gesture operation. For example, the trigger operation is an operation directly or indirectly triggered on the group chat inviting control.

The group chat management interaction region is a UI element or a UI region or an interface used for creating a group chat session, and/or selecting a UI element or a UI region or an interface for an existing group chat session. For example, the group chat management interaction region includes at least one of a group chat session creation control and an existing group chat session list item.

Step 208-3. Display a first group chat interface in response to a group chat creation operation on the group chat management interaction region, where the first group chat interface is an interface of a group chat session newly created between a local logged-in account and all the contact accounts or the at least one contact account in the n contact accounts.

The group chat creation operation includes at least one of a click operation, a double-click operation, a long-press operation, a sliding operation, a floating touch operation, a pressure touch operation, an eye gaze operation, a voice control operation, a motion sensing operation, and a gesture operation. The group chat creation operation is an operation directly or indirectly triggered on the group chat session creation control.

Step 208-4. Display a second group chat interface in response to a group chat selection operation on the group chat management interaction region, where the second group chat interface is an interface inviting all the contact accounts or the at least one contact account in the n contact accounts to join a selected existing group chat session.

The group chat selection operation includes at least one of a click operation, a double-click operation, a long-press operation, a sliding operation, a floating touch operation, a pressure touch operation, an eye gaze operation, a voice control operation, a motion sensing operation, and a gesture operation. The group chat selection operation is an operation directly or indirectly triggered on an existing group chat session list item.

Figure 11:
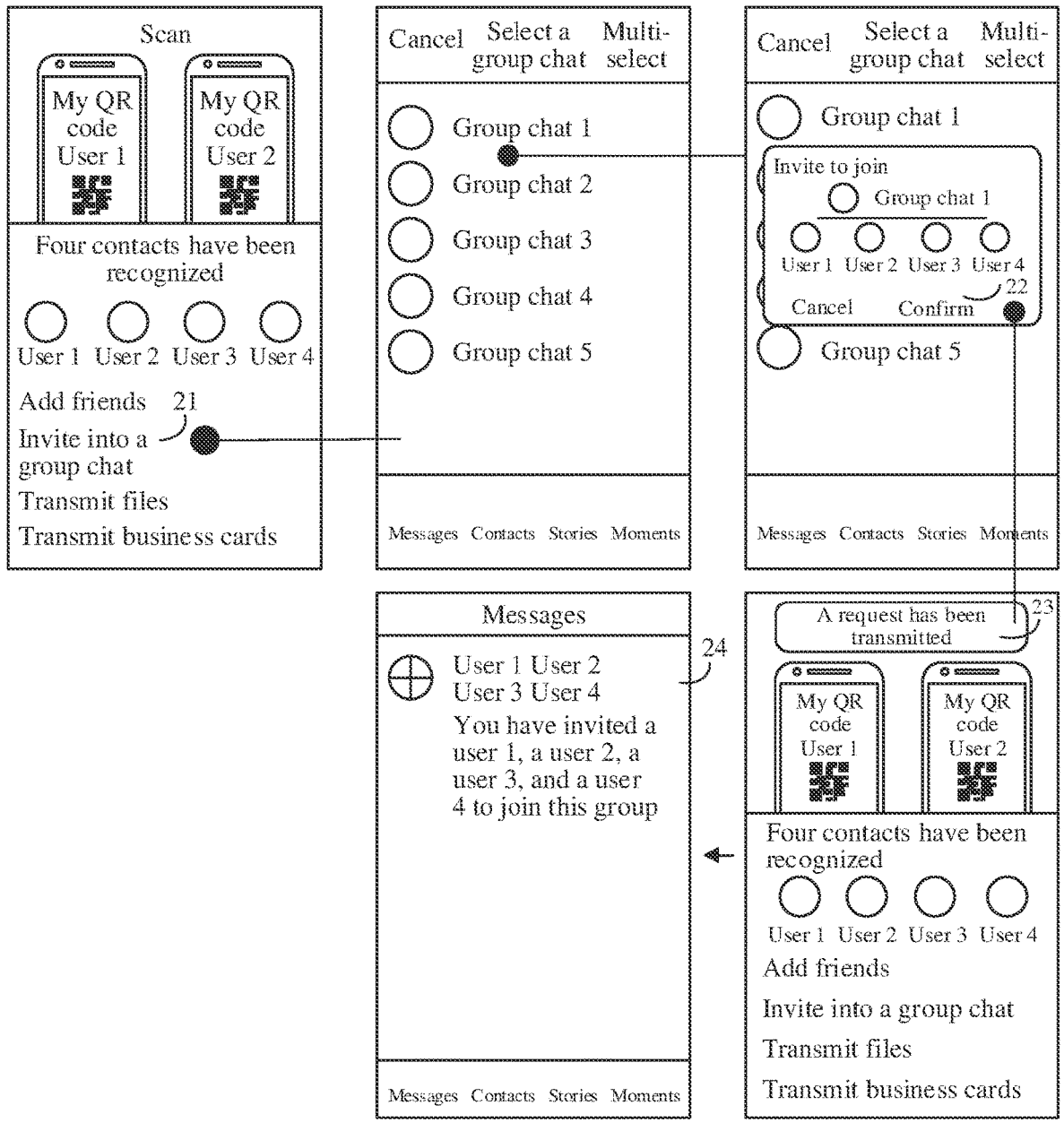
FIG. 11 is a schematic diagram of an interface of a graphic code processing method according to an example embodiment of this application.

For example, referring to FIG. 11, the user clicks the group chat inviting control 21 on the service processing interaction region, and the client displays a group chat management interface. The group chat management interface includes a group chat session creation control "creating a new group chat", and the recently opened existing group chat session list items: a group chat 1 to a group chat 9. The user clicks the group chat 1 to trigger an interface inviting all the contact accounts or the at least one contact account in the n contact accounts to join the selected group chat 1.

Because all or part of the n contact accounts are stranger accounts, the group chat session may be a temporary group chat session, that is, a group chat session that can be entered without adding each other as friends.

In summary, in the method provided in this embodiment, by scanning the graphic codes of a plurality of contact accounts in batches, the contact accounts can be quickly invited into a group chat in batches, and steps performed when the terminal adds friends one by one and then invites the friends into the group chat one by one are reduced, thereby improving the processing efficiency of the terminal.

The Service includes: Transmitting Files.

Figure 12:
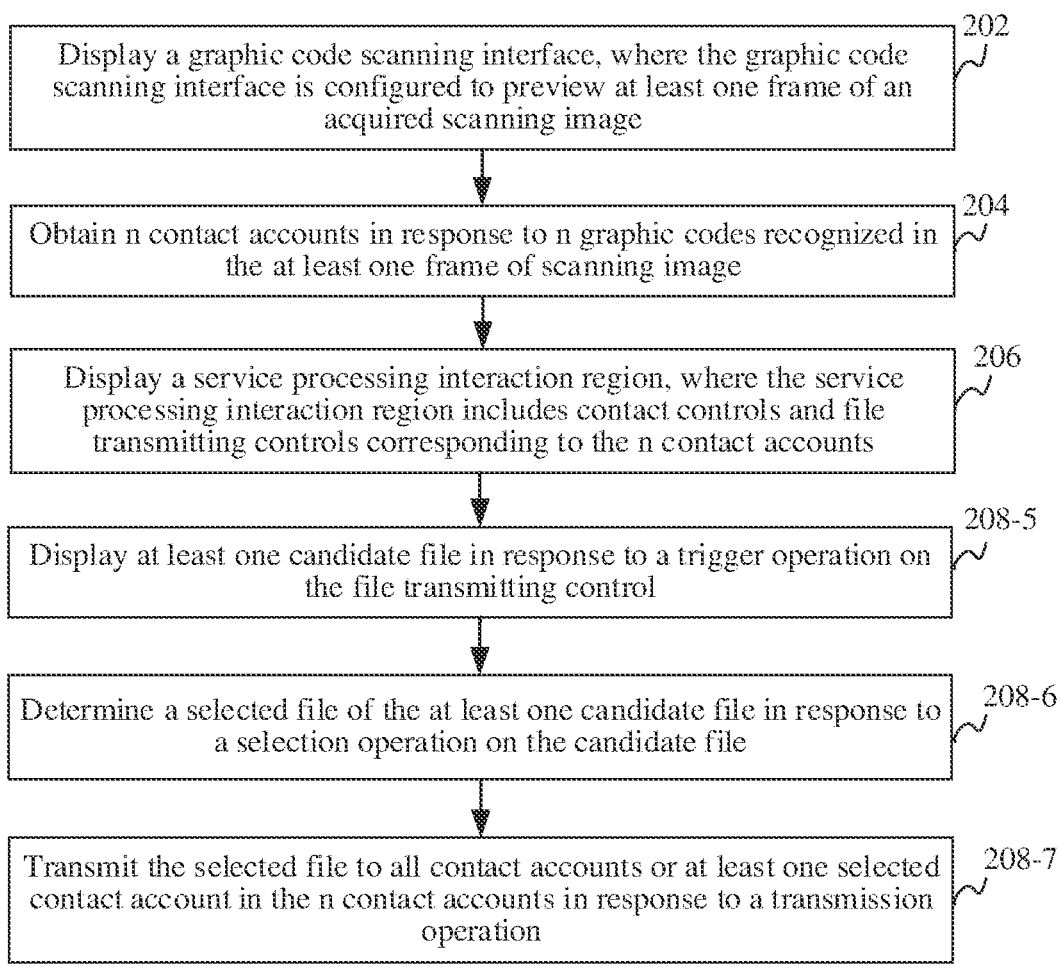
FIG. 12 is a flowchart of a graphic code processing method according to an example embodiment of this application.

The first service control includes a file transmitting control. That is, the first service control is the file transmitting control, or the file transmitting control is one of a plurality of first service controls, or the file transmitting control is a sub control of the first service control. The step 208 includes step 208-5, as shown in FIG. 12:

Step 208-5. Display at least one candidate file in response to the trigger operation on the file transmitting control.

The trigger operation includes at least one of a click operation, a double-click operation, a long-press operation, a sliding operation, a floating touch operation, a pressure touch operation, an eye gaze operation, a voice control operation, a motion sensing operation, and a gesture operation. For example, the trigger operation is an operation directly or indirectly triggered on the file transmitting control.

Candidate files include: a plurality of files in the terminal or in the client. For example, the twenty most recently used/received/transmitted files. Types of the candidate files include, but are not limited to, at least one of documents, pictures, audio, and videos.

Step 208-6. Determine a selected file in the at least one candidate file in response to a selection operation on the at least one candidate file.

The selection operation includes at least one of a click operation, a double-click operation, a long-press operation, a sliding operation, a floating touch operation, a pressure touch operation, an eye gaze operation, a voice control operation, a motion sensing operation, and a gesture operation. For example, the selection operation is an operation directly or indirectly triggered on the candidate files.

Step 208-7. Transmit the selected file to all the contact accounts or the at least one contact account in the n contact accounts in response to a transmission operation.

The transmission operation includes at least one of a click operation, a double-click operation, a long-press operation, a sliding operation, a floating touch operation, a pressure touch operation, an eye gaze operation, a voice control operation, a motion sensing operation, and a gesture operation. In some embodiments, a transmitting control is further displayed on the file selection interface. The transmission operation is an operation directly or indirectly triggered on the transmitting control.

Figure 13:
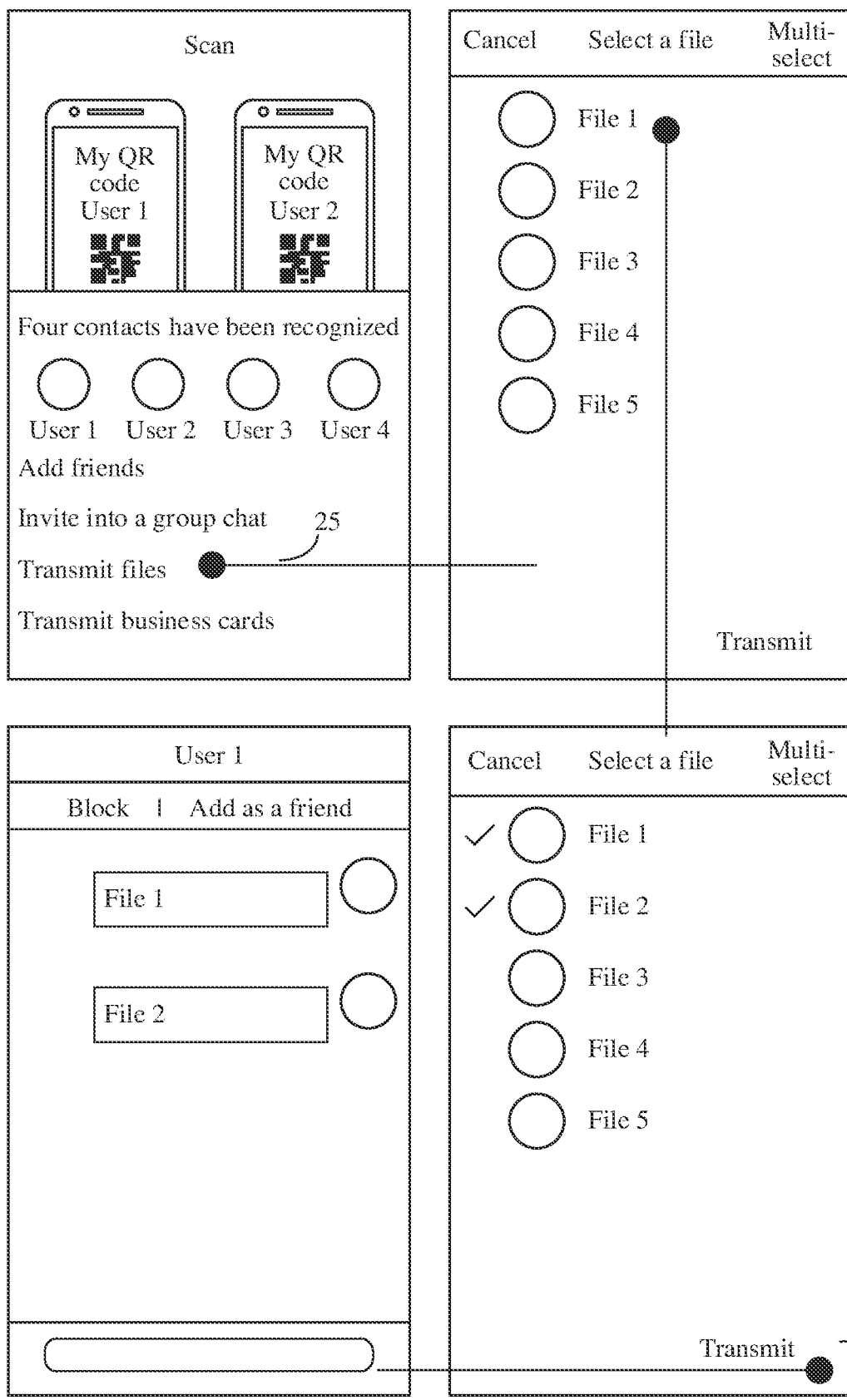
FIG. 13 is a schematic diagram of an interface of a graphic code processing method according to an example embodiment of this application.

For example, referring to FIG. 13, the user clicks the file transmitting control 24 on the service processing interaction region, and the client displays a file selection interface. The file selection interface includes a plurality of candidate files 1 to 8. After the user checks the file 1 and the file 2, and then clicks the transmitting control 25, transmission of the file 1 and the file 2 to all the contact accounts or the at least one contact account in the n contact accounts is triggered.

Because all or part of the n contact accounts are stranger accounts, in this embodiment of this application, files can be quickly transmitted without adding each other as friends.

In summary, in the method provided in this embodiment, by scanning the graphic codes of a plurality of contact accounts in batches, files can be quickly transmitted to strangers in batches, and steps performed during adding friends and transmitting the files to the friends one by one are reduced, thereby improving the processing efficiency of the terminal.

The Service includes: Transmitting a Business Card.

Figure 14:
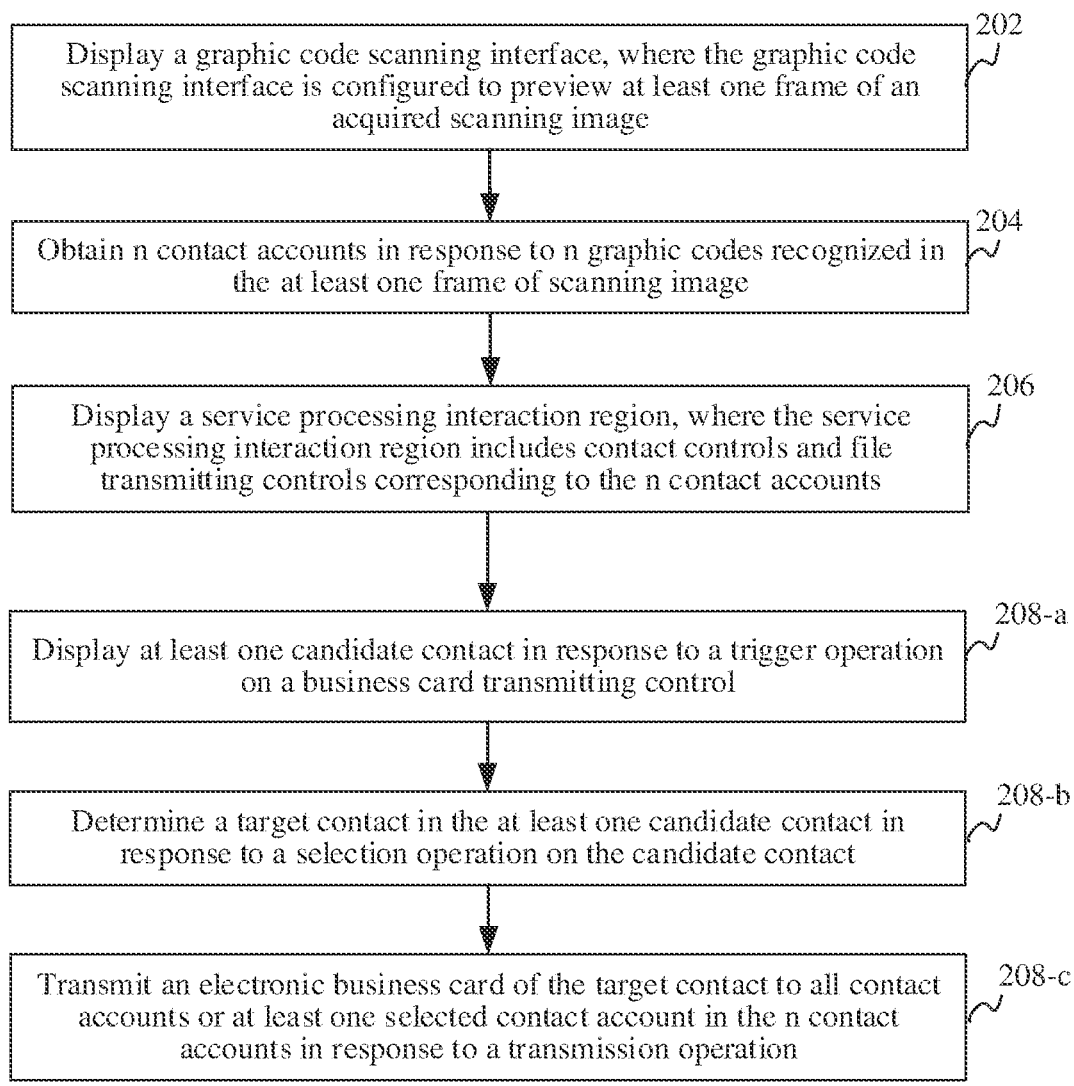
FIG. 14 is a flowchart of a graphic code processing method according to an example embodiment of this application.

The first service control includes a business card transmitting control. That is, the first service control is the business card transmitting control, or the business card transmitting control is one of a plurality of first service controls, or the business card transmitting control is a sub control of the first service control. The step 208 includes step 208-a to 208-c, as shown in FIG. 14:

Step 208-a. Display at least one candidate contact in response to the trigger operation on the business card transmitting control.

The trigger operation includes at least one of a click operation, a double-click operation, a long-press operation, a sliding operation, a floating touch operation, a pressure touch operation, an eye gaze operation, a voice control operation, a motion sensing operation, and a gesture operation. For example, the trigger operation is an operation directly or indirectly triggered on the business card transmitting control.

Candidate contacts include: a plurality of contacts whose local logged-in accounts are added as friends. In some embodiments, the candidate contacts further include contacts established with other social relationship chains, such as contacts established with temporary sessions.

Step 208-b. Determine a target contact in the at least one candidate contact in response to a selection operation on the at least one candidate contact.

The selection operation includes at least one of a click operation, a double-click operation, a long-press operation, a sliding operation, a floating touch operation, a pressure touch operation, an eye gaze operation, a voice control operation, a motion sensing operation, and a gesture operation. For example, the selection operation is an operation directly or indirectly triggered on the candidate contacts.

Step 208-c. Transmit an electronic business card of the target contact to all the contact accounts or the at least one contact account in the n contact accounts in response to a transmission operation.

The transmission operation includes at least one of a click operation, a double-click operation, a long-press operation, a sliding operation, a floating touch operation, a pressure touch operation, an eye gaze operation, a voice control operation, a motion sensing operation, and a gesture operation. In some embodiments, a transmitting control is further displayed on a contact selection interface. For example, the transmission operation is an operation directly or indirectly triggered on the transmitting control.

Figure 15:
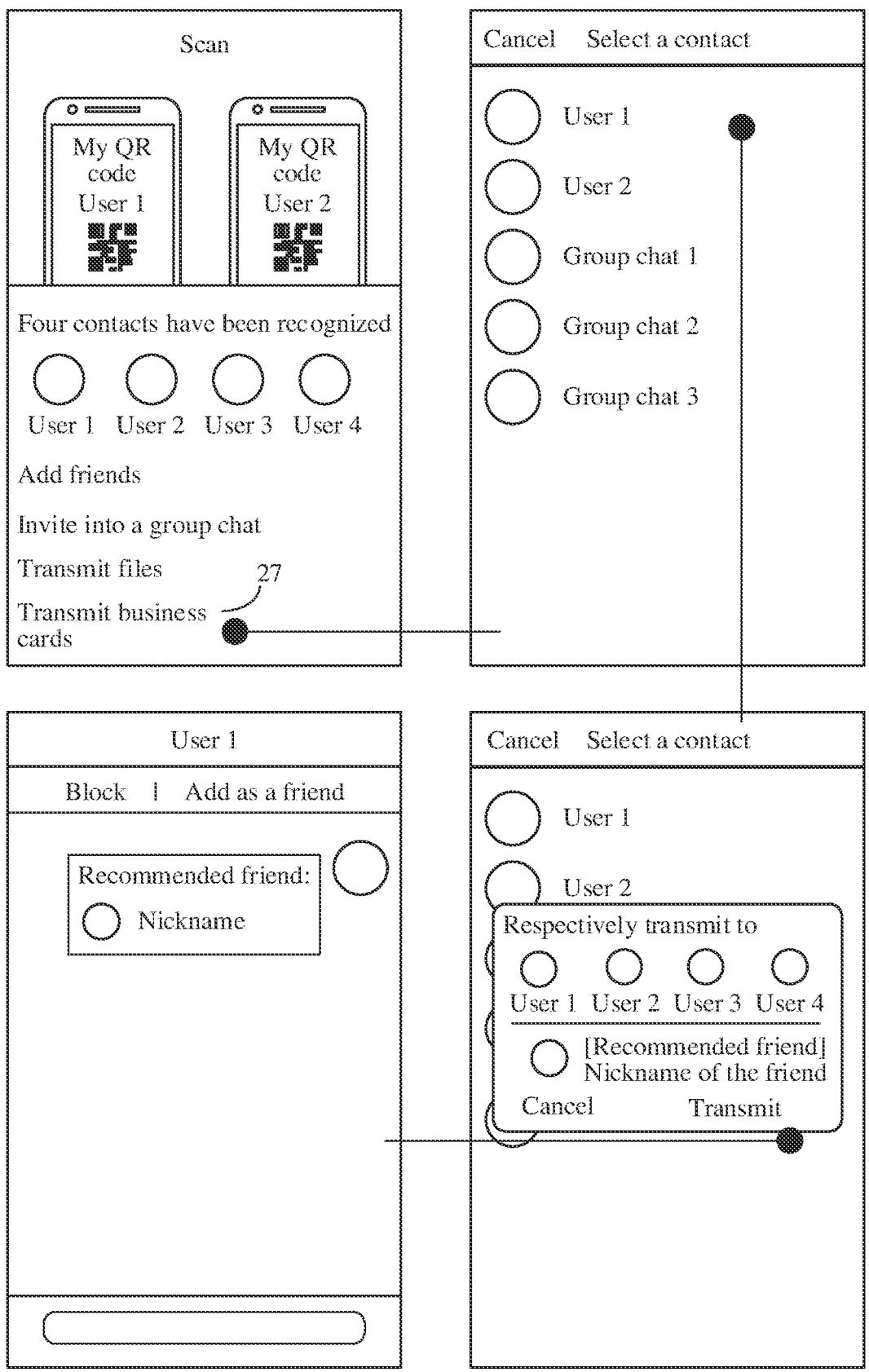
FIG. 15 is a schematic diagram of an interface of a graphic code processing method according to an example embodiment of this application.

For example, referring to FIG. 15, the user clicks the business card transmitting control 27 on the service processing interaction region, and the client displays a contact selection interface. The contact selection interface includes a plurality of candidate contacts. After the user checks a specific user as a target contact, and then clicks the transmitting control 28, transmission of a business card of the target contact to all the contact accounts or the at least one contact account in the n contact accounts is triggered. In some embodiments, before clicking the transmitting control 28, the user can further edit a message, so that the message is transmitted together with the business card of the target contact.

Because all or part of the n contact accounts are stranger accounts, in this embodiment of this application, business cards can be quickly transmitted without adding each other as friends.

In summary, in the method provided in this embodiment, by scanning the graphic codes of a plurality of contact accounts in batches, business cards can be quickly transmitted to strangers in batches, and steps performed during adding friends and transmitting the business cards to the friends one by one are reduced, thereby improving the processing efficiency of the terminal.

The Service includes: a Multi-Person to-do Control.

Figure 16:
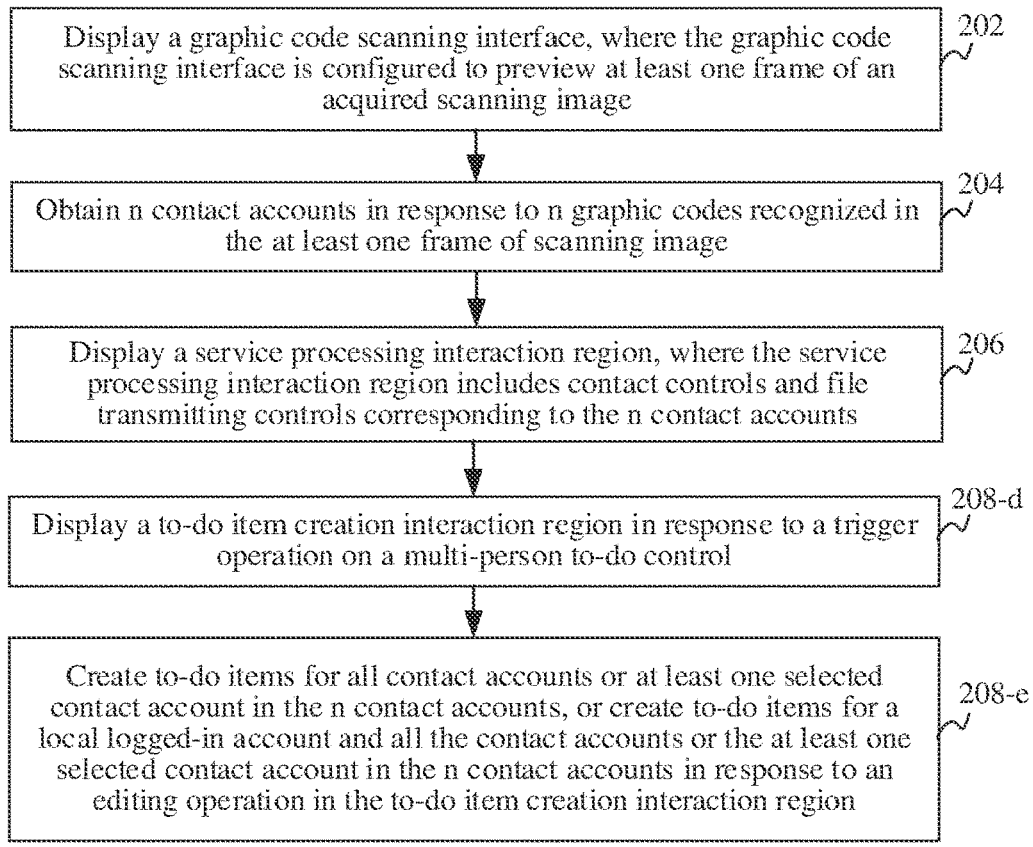
FIG. 16 is a flowchart of a graphic code processing method according to an example embodiment of this application.

The first service control includes the multi-person to-do control. That is, the first service control is the multi-person to-do control, or the multi-person to-do control is one of a plurality of first service controls, or the multi-person to-do control is a sub control of the first service control. The step 208 includes step 208-d and step 208-e, as shown in FIG. 16:

Step 208-d. Display a to-do item creation interaction region in response to a trigger operation on the multi-person to-do control.

The trigger operation includes at least one of a click operation, a double-click operation, a long-press operation, a sliding operation, a floating touch operation, a pressure touch operation, an eye gaze operation, a voice control operation, a motion sensing operation, and a gesture operation. An operation that related itineraries and arrangements are synchronously triggered within the group is an operation triggered directly or indirectly on the multi-person to-do control.

Step 208-e. Create to-do items for all the contact accounts or the at least one contact account in the n contact accounts, or create the to-do items for the local logged-in account and all the contact accounts or the at least one contact account in the n contact accounts in response to an editing operation on the to-do item creation interaction region.

The editing operation is used for creating at least one of an item title, item content, time, location, remark, and attachment of the to-do items. The to-do item creation interaction region can be a separate interface, a region in the service processing interaction region, or a region superimposed on the service processing interaction region.

Figure 17:
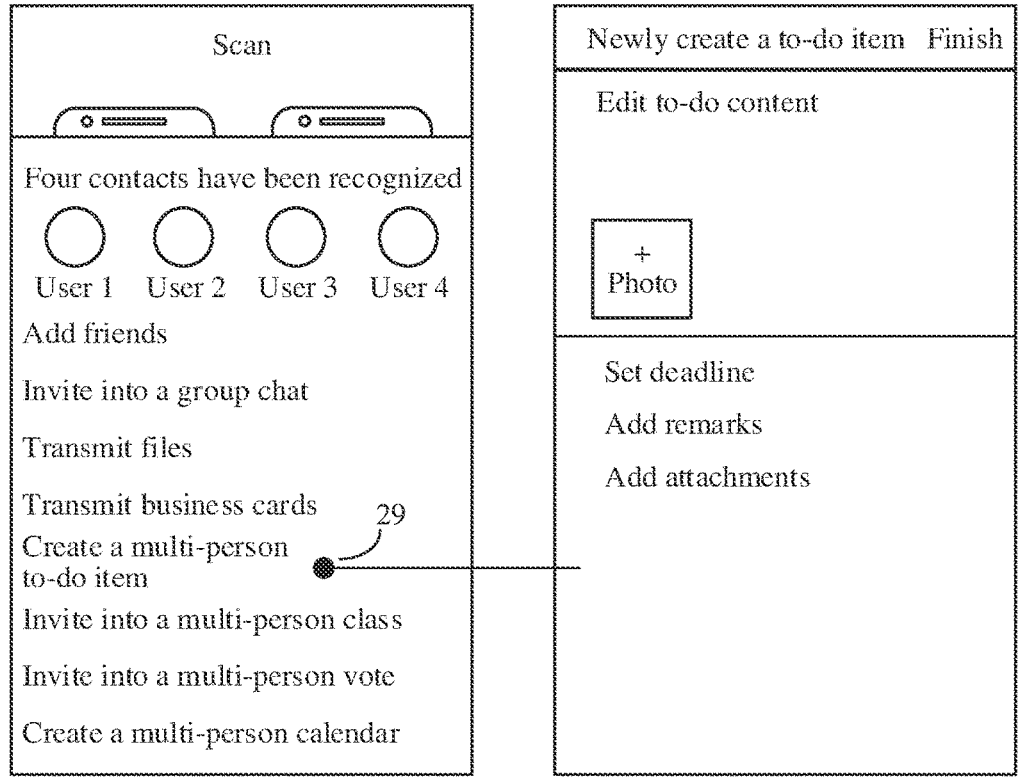
FIG. 17 is a schematic diagram of an interface of a graphic code processing method according to an example embodiment of this application.

For example, referring to FIG. 17, the user clicks the multi-person to-do creation control 29 on the service processing interaction region, and the client displays the to-do item creation interface. The user edits various parameters of the to-do items on the to-do item creation interface, and then clicks a finish button, so that creation of to-do items for all the contact accounts or the at least one contact account in the n contact accounts is triggered, or creates the to-do items for the local logged-in account and all the contact accounts or the at least one contact account in the n contact accounts.

Because all or part of the n contact accounts are stranger accounts, in this embodiment of this application, to-do items can be quickly created without adding each other as friends.

In summary, in the method provided in this embodiment, by scanning the graphic codes of a plurality of contact accounts in batches, to-do items can be quickly created to strangers in batches, and steps performed during adding friends and creating the to-do items are reduced, thereby improving the processing efficiency of the terminal.

The Service includes: a Multi-Person Voting Control.

Figure 18:
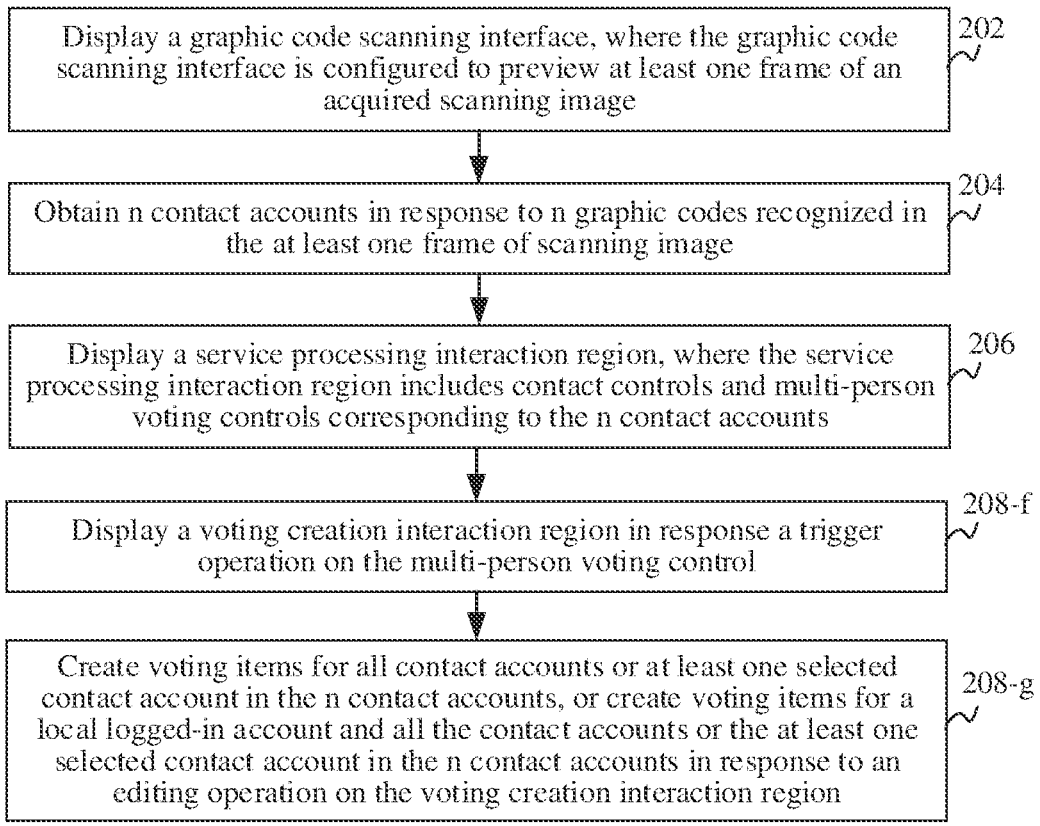
FIG. 18 is a flowchart of a graphic code processing method according to an example embodiment of this application.

The first service control includes the multi-person to-do control. That is, the first service control is the multi-person to-do control, or the multi-person to-do control is one of a plurality of first service controls, or the multi-person to-do control is a sub control of the first service control. The step 208 includes step 208-f and step 208-g, as shown in FIG. 18:

Step 208-f. Display a voting item creation interface in response to a trigger operation on the multi-person voting control.

The trigger operation includes at least one of a click operation, a double-click operation, a long-press operation, a sliding operation, a floating touch operation, a pressure touch operation, an eye gaze operation, a voice control operation, a motion sensing operation, and a gesture operation. For example, the trigger operation is an operation directly or indirectly triggered on the multi-person voting control.

Step 208-g. Create voting items for all the contact accounts or the at least one contact account in the n contact accounts, or create the voting items for the local logged-in account and all the contact accounts or the at least one contact account in the n contact accounts in response to an editing operation on the voting item creation interaction region.

The editing operation is used for creating at least one of an item title, a voting option, a deadline, a remark, whether multi-choice being allowed, and whether anonymous voting being allowed of the voting items. The voting item creation interaction region can be a separate interface, a region in the service processing interaction region, or a region superimposed on the service processing interaction region.

Figure 19:
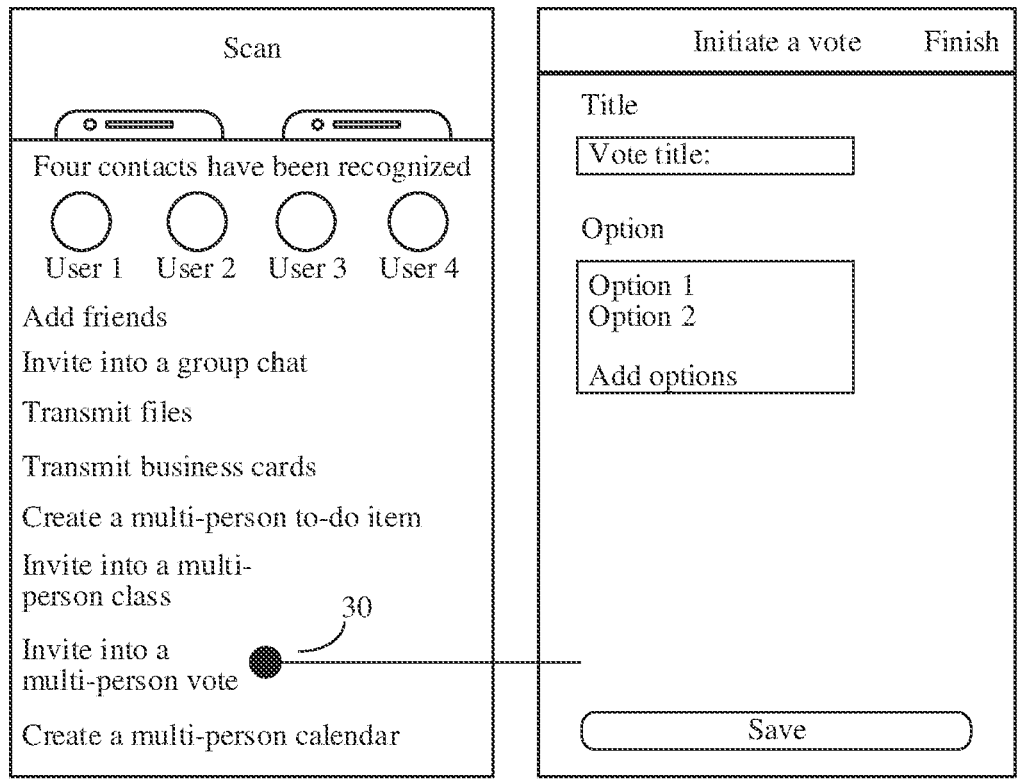
FIG. 19 is a schematic diagram of an interface of a graphic code processing method according to an example embodiment of this application.

For example, referring to FIG. 19, the user clicks the multi-person voting creation control 30 on the service processing interaction region, and the client displays the voting item creation interface. The user edits various parameters of the voting items on the voting item creation interface, and then clicks a finish button, so that creation of voting items for all the contact accounts or the at least one contact account in the n contact accounts is triggered, or creates the voting items for the local logged-in account and all the contact accounts or the at least one contact account in the n contact accounts.

Because all or part of the n contact accounts are stranger accounts, in this embodiment of this application, voting items can be quickly created without adding each other as friends.

In summary, in the method provided in this embodiment, by scanning the graphic codes of a plurality of contact accounts in batches, voting items can be quickly created to strangers in batches, and steps performed during adding friends and then creating the voting items are reduced, thereby improving the processing efficiency of the terminal.

The Service includes: Inviting into an Online Class.

Figure 20:
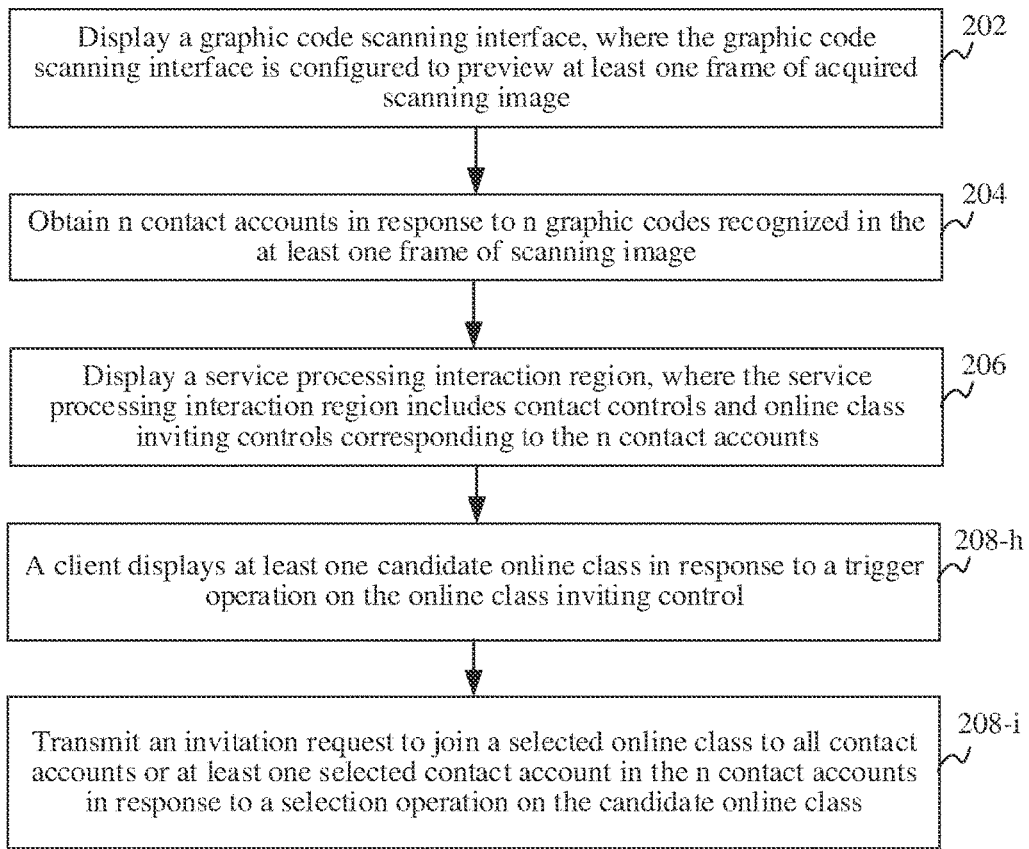
FIG. 20 is a flowchart of a graphic code processing method according to an example embodiment of this application.

The first service control includes an online class inviting control. That is, the first service control is the online class inviting control, or the online class inviting control is one of a plurality of first service controls, or the online class inviting control is a sub control of the first service control. The step 208 includes step 208-h and step 208-i, as shown in FIG. 20:

Step 208-h. The client displays at least one candidate online class in response to the trigger operation on the online class inviting control.

The trigger operation includes at least one of a click operation, a double-click operation, a long-press operation, a sliding operation, a floating touch operation, a pressure touch operation, an eye gaze operation, a voice control operation, a motion sensing operation, and a gesture operation. For example, the trigger operation is an operation directly or indirectly triggered on the online class inviting control.

An online class selection interface is an interface used for selecting the at least one candidate online class.

Step 208-i. Transmit an invitation request to join a selected online class to all the contact accounts or the at least one contact account in the n contact accounts in response to a selection operation on the at least one candidate online class.

The selection operation includes at least one of a click operation, a double-click operation, a long-press operation, a sliding operation, a floating touch operation, a pressure touch operation, an eye gaze operation, a voice control operation, a motion sensing operation, and a gesture operation. For example, the selection operation is an operation directly or indirectly triggered on the existing online class list item.

Figure 21:
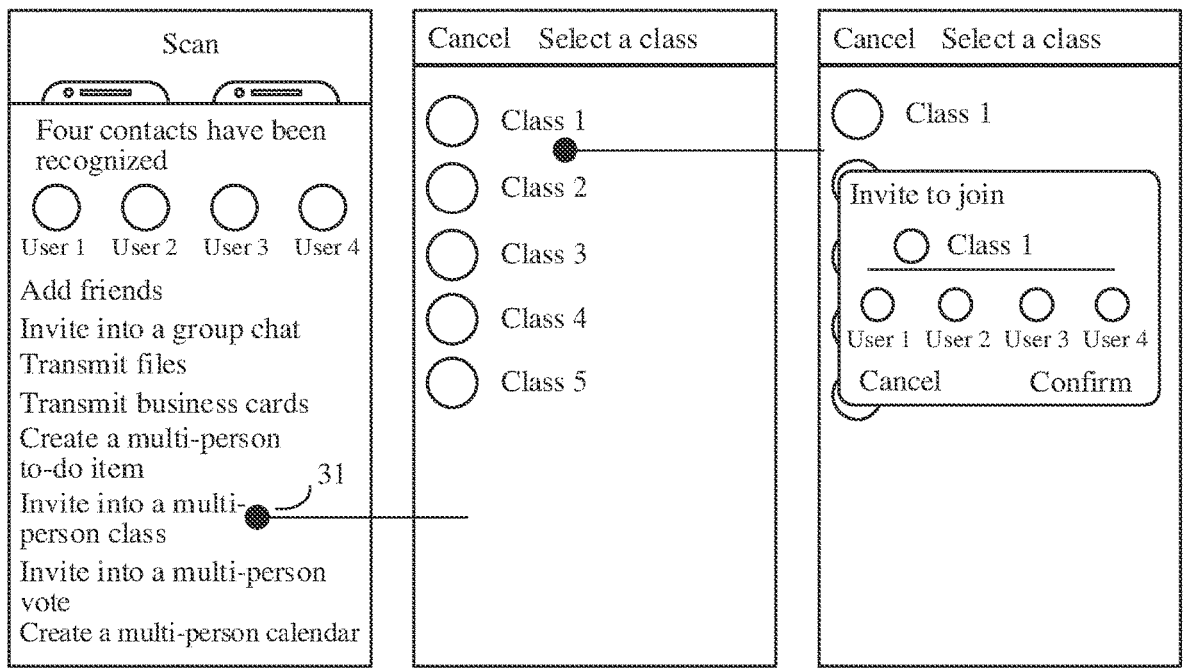
FIG. 21 is a schematic diagram of an interface of a graphic code processing method according to an example embodiment of this application.

For example, referring to FIG. 21, the user clicks the online class inviting control 31 on the service processing interaction region, and the client displays an online class selection interface. The online class management interface includes a plurality of candidate online classes: an online class 1 to an online class 9. The user clicks the online class 1 to trigger an interface inviting all the contact accounts or the at least one contact account in the n contact accounts to join the selected online class 1.

Because all or part of the n contact accounts are stranger accounts, the online class session may be a temporary online class session, that is, an online class session that can be entered without adding each other as friends.

In summary, in the method provided in this embodiment, by scanning the graphic codes of a plurality of contact accounts in batches, the contact accounts can be quickly invited into an online class in batches, and steps performed during adding friends and then inviting the friends into the online class one by one are reduced, thereby improving the processing efficiency of the terminal.

Figure 22:
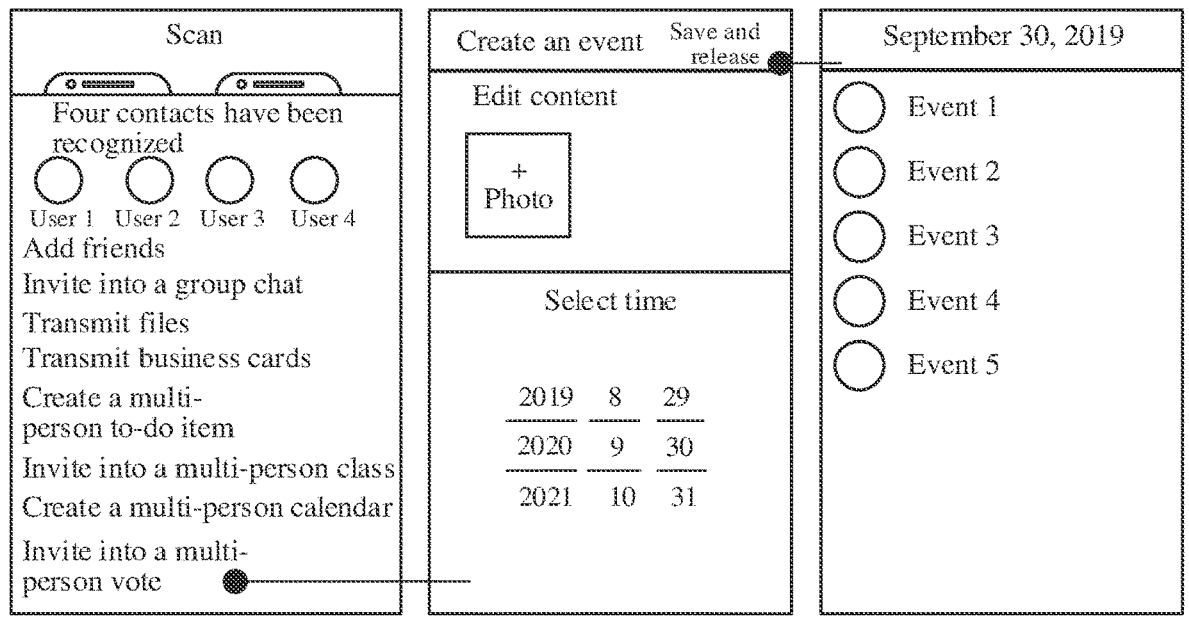
FIG. 22 is a schematic diagram of an interface of a graphic code processing method according to an example embodiment of this application.

The services may further be other multi-person services, such as scenarios such as multi-person calendar, multi-person payment collection, and multi-person payment, which are not repeated in this application. For example, referring to FIG. 22, the user clicks a multi-person calendar creation control on the service processing interaction region, and the client displays an event creation interface. The user edits various parameters of a calendar event item on the item creation interface, and then clicks a finish button, so that release of a calendar event for all the contact accounts or the at least one contact account in the n contact accounts is triggered, or releases the calendar event for the local logged-in account and all the contact accounts or the at least one contact account in the n contact accounts.

Figure 23:
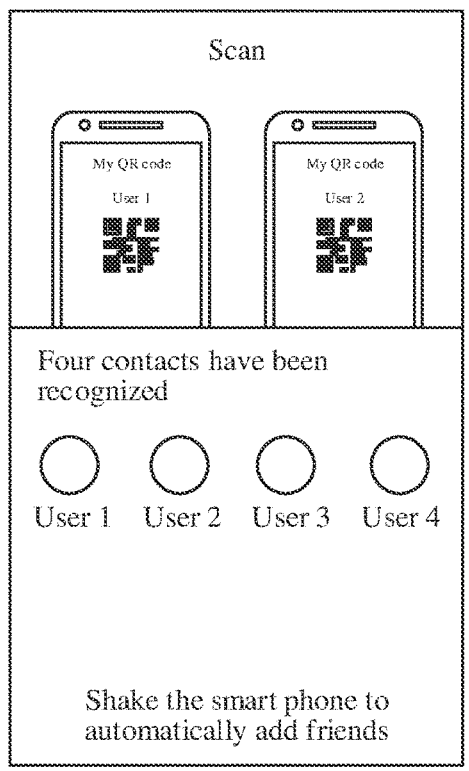
FIG. 23 is a schematic diagram of an interface of a graphic code processing method according to an example embodiment of this application.

The first service control may not be displayed. For example, in the example shown in FIG. 23, the user transmits a friend adding request to all the contact accounts or the at least one contact account in the n contact accounts through a shake operation, without displaying the first service control.

Figure 24:
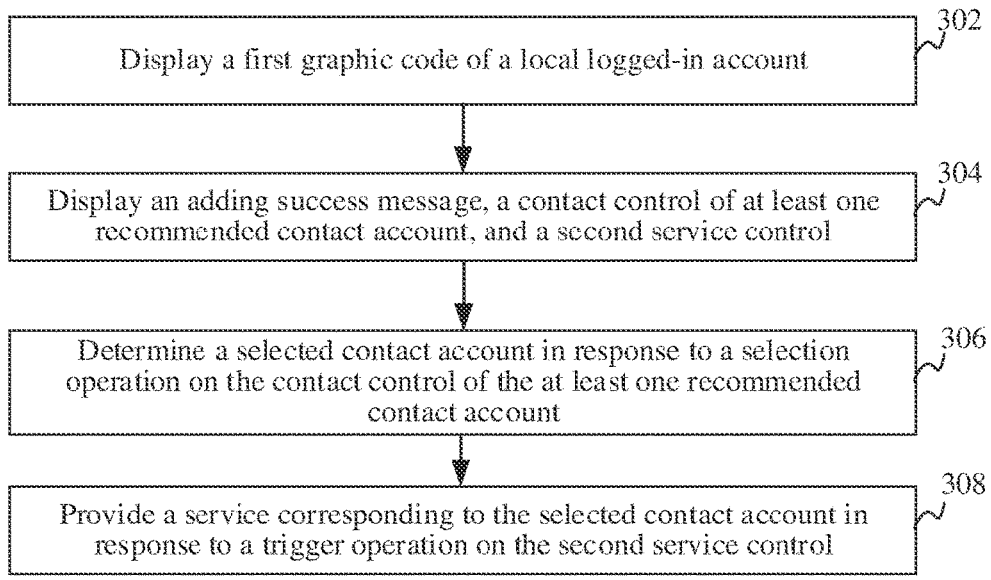
FIG. 24 is a flowchart of a graphic code processing method according to an example embodiment of this application.

When the client is a client of the scanned graphic code, the method may optionally include the following steps, as shown in FIG. 24:

Step 302. Display a first graphic code of a local logged-in account.

The first graphic code corresponds to the local logged-in account. For example, information carried in the graphic code includes: a local logged-in account, or the local logged-in account and other information. The other information includes: at least one of an official website address of an instant messaging program, a nickname of a local logged-in account, an avatar of the local logged-in account, a signature of the local logged-in account, and gender of the local logged-in account.

Step 304. Display an adding success message, a contact control of at least one recommended contact account, and a second service control, where the adding success message is a message transmitted after the local logged-in account is successfully added by other contact accounts as a friend by scanning the first graphic code and a second graphic code in batches, and the at least one recommended contact account is a contact account corresponding to the second graphic code; and the other contact accounts are contact accounts other than the local logged-in account and the at least one recommended contact account.

The second service control includes at least one of: the friend adding control, the group chat inviting control, the file transmitting control, the business card transmitting control, a multi-person to-do control, a multi-person voting control, an online class inviting control, and an aggregation control, where the aggregation control is a control that displays at least two of the friend adding control, the group chat inviting control, the file transmitting control, the business card transmitting control, the multi-person to-do control, the multi-person voting control, and the online class inviting control in an aggregating manner.

Step 306. Determine a selected contact account in response to a selection operation on the contact control of the recommended contact.

The selection operation includes at least one of a click operation, a double-click operation, a long-press operation, a sliding operation, a floating touch operation, a pressure touch operation, an eye gaze operation, a voice control operation, a motion sensing operation, and a gesture operation. For example, the selection operation is an operation directly or indirectly triggered on the recommended contact.

Step 308. Provide a service corresponding to the selected contact account in response to a trigger operation on the second service control.

The trigger operation includes at least one of a click operation, a double-click operation, a long-press operation, a sliding operation, a floating touch operation, a pressure touch operation, an eye gaze operation, a voice control operation, a motion sensing operation, and a gesture operation. For example, the trigger operation is an operation directly or indirectly triggered on the second service control.

Figure 25:
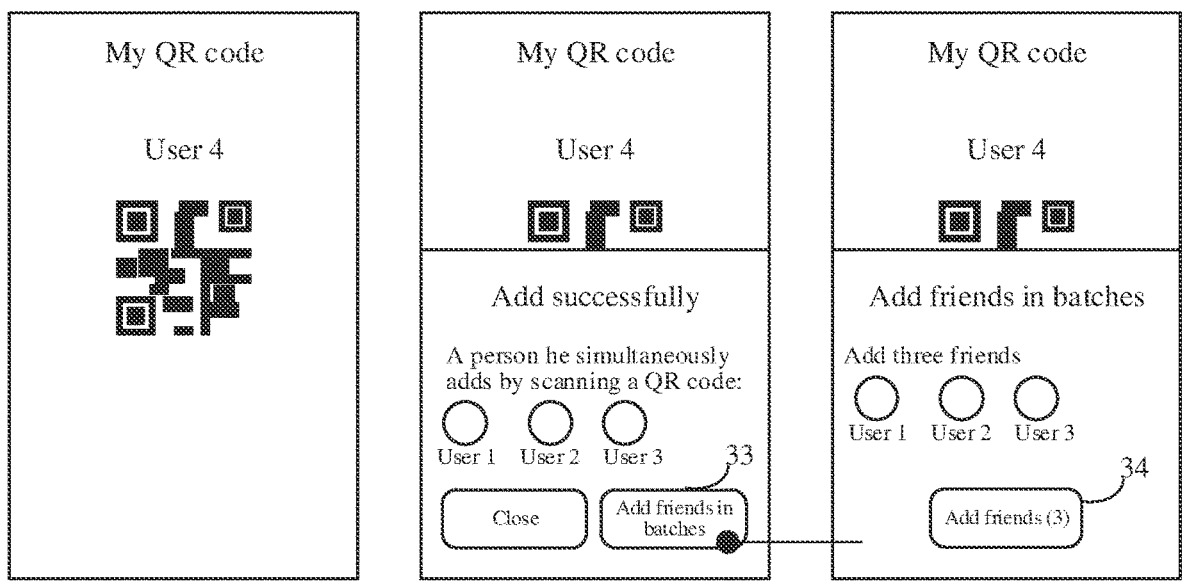
FIG. 25 is a schematic diagram of an interface of a graphic code processing method according to an example embodiment of this application.

For example, referring to FIG. 25, using the second service control including the friend adding control 33 as an example, the user clicks the friend adding control 33, and the client displays the friend adding interface. The friend adding interface includes a transmitting control and a verification information filling region. The verification information filling region can automatically fill in default verification information, or verification information can be customized by the user. After the user clicks the friend adding control 34, the client transmits a friend adding request to all contact accounts or at least one selected contact account in the n contact accounts.

In some embodiments, the client directly transmits a friend adding request to all the contact accounts or the at least one contact account in the n contact accounts in response to the trigger operation on the friend adding control 33, and there is no need to manually fill in the verification information and manually click the friend adding control.

For example, referring to FIG. 26, using the second service control including the aggregation control 35 as an example, after the user clicks the aggregation control 35, a plurality of second service sub controls are popped up and displayed: adding friends, inviting into a group chat, transmitting files, and transmitting business cards. The user can select any second service sub control to trigger subsequent services.

In summary, in the method provided in this embodiment, after scanning the graphic codes of a plurality of contact accounts in batches, a user can quickly add friends in batches. Terminals of other scanned users can also add a plurality of contact accounts as friends in batches without scanning codes, so that the terminals of the plurality of users can quickly perform the step of adding friends two by two, thereby improving the processing efficiency of the terminal.

In an optional embodiment based on the foregoing embodiments, when a plurality of QR codes are included on the same frame of scanning image, the step 204 may include the following sub step 204*a* and sub step 204*b*, as shown in FIG. 27:

Step 204*a*. In response to the n graphic codes being included on a first scanning image in the at least one frame of scanning image, perform region segmentation on the first scanning image to obtain image regions corresponding to the n graphic codes.

Using a QR code as an example, when n graphic codes are included on the same frame of scanning image, the client performs region segmentation on the first scanning image according to a positioning point of the QR code, and obtains image regions corresponding to n QR codes.

Step 204*b*. Respectively perform recognition on the graphic codes in the image regions to obtain the n contact accounts.

In summary, in the method provided in this embodiment, region segmentation is performed on the first scanning image when n graphic codes are included on the first scanning image, and image regions corresponding to the n graphic codes are obtained, so that scanning graphic codes of a plurality of contact accounts in batches is implemented, thereby improving the processing efficiency of the terminal.

In an optional embodiment based on the foregoing embodiments, when a plurality of QR codes are included on different frames of scanning images, the step 204 may include the following sub step 204*a* and sub step 204*b*, as shown in FIG. 28:

Step 204-1. Splice at least two frames of scanning images to obtain a spliced scanning image.

In a possible design, the at least two frames of scanning images are spliced to obtain the spliced scanning image in response to a difference between graphic codes on at least two frames of scanning images.

In another possible design, in response to receiving a continuous operation on the code scanning control on the graphic code scanning interface, at least two frames of scanning images acquired are spliced during the continuous operation to obtain the spliced scanning image. The continuous operation may be a long-press touch operation or a pressure touch operation.

Step 204-2. Perform region segmentation on the spliced scanning image to obtain image regions corresponding to the n graphic codes.

Using a QR code as an example, when n graphic codes are included on the same frame of scanning image, the client performs region segmentation on the first scanning image according to a positioning point of the QR code, and obtains image regions corresponding to n QR codes.

Step 204-3. Respectively perform recognition on the graphic codes in the image regions to obtain the n contact accounts.

Figure 29:
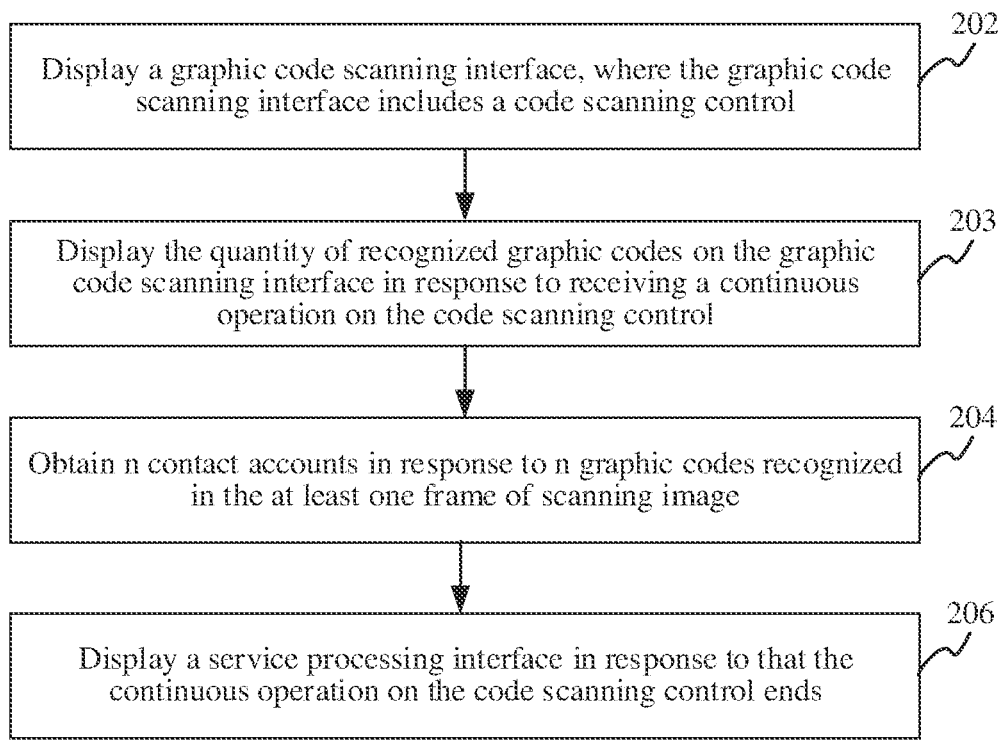
FIG. 29 is a flowchart of a graphic code processing method according to an example embodiment of this application.

In an optional embodiment based on the foregoing embodiments, this application further provides a long-press scanning manner. The method further includes step 203, as shown in FIG. 29.

Step 203. Display the quantity of recognized graphic codes on the graphic code scanning interface in response to receiving a continuous operation on a code scanning control.

In some embodiments, the animation effect that the recognized graphic code gradually shrinks and moves to the code scanning control is displayed on the graphic code scanning interface.

Figure 30:
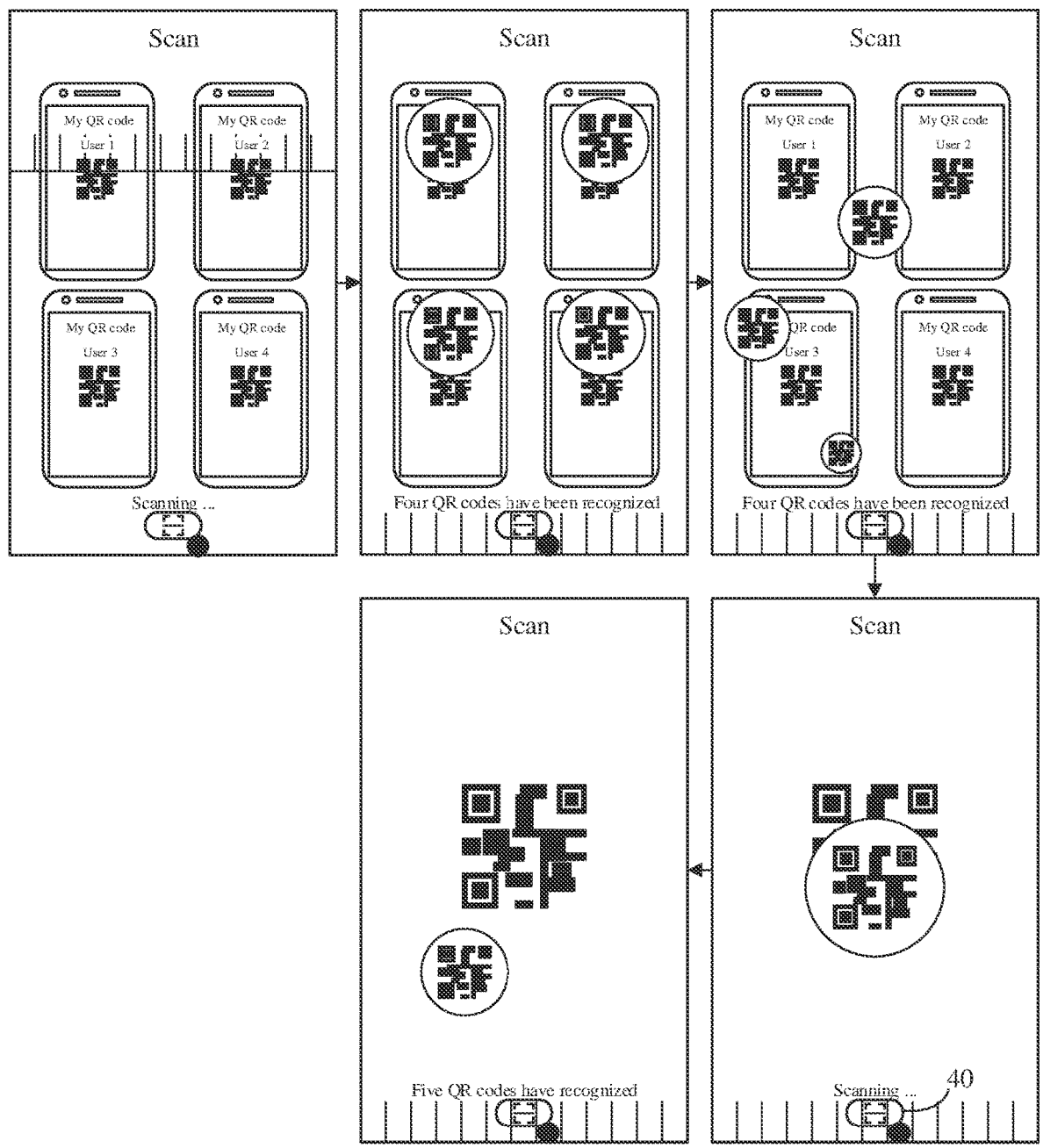
FIG. 30 is a schematic diagram of an interface of a graphic code processing method according to an example embodiment of this application.
Figure 31:
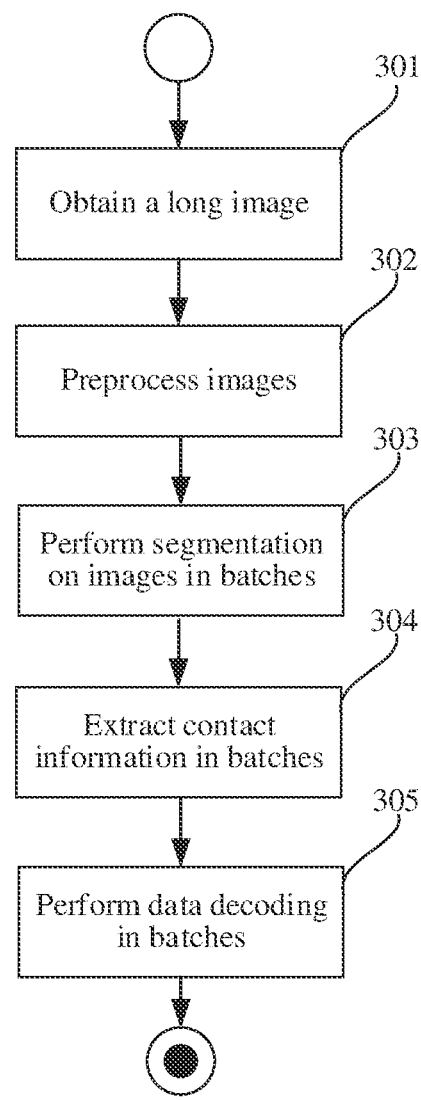
FIG. 31 is a flowchart of a graphic code processing method according to an example embodiment of this application.

For example, referring to FIG. 30, a code scanning button 40 is displayed on the graphic code scanning interface. The user long presses the code scanning button 40 trigger continuous recognition of the scanning image. The client splices at least two frames of scanning images acquired during the continuous operation to obtain the spliced scanning image. Graphic codes in spliced scanning images are recognized.

Each time a graphic code is recognized, the client displays the animation effect that the recognized graphic code gradually shrinks and moves to the code scanning control on the graphic code scanning interface, and displays the quantity of the recognized graphic codes around the code scanning button 40.

Step 206. Display a service processing interaction region in response to that the continuous operation on the code scanning control ends.

In summary, in the method provided in this embodiment, two recognition modes such as default scanning and long-press scanning are distinguished based on the experience of recognizing QR codes in batches. When receiving the long-press scanning, the terminal can recognize more QR codes in more ample time, thereby improving the efficiency of scanning the graphic codes by the terminal.

Figure 32:
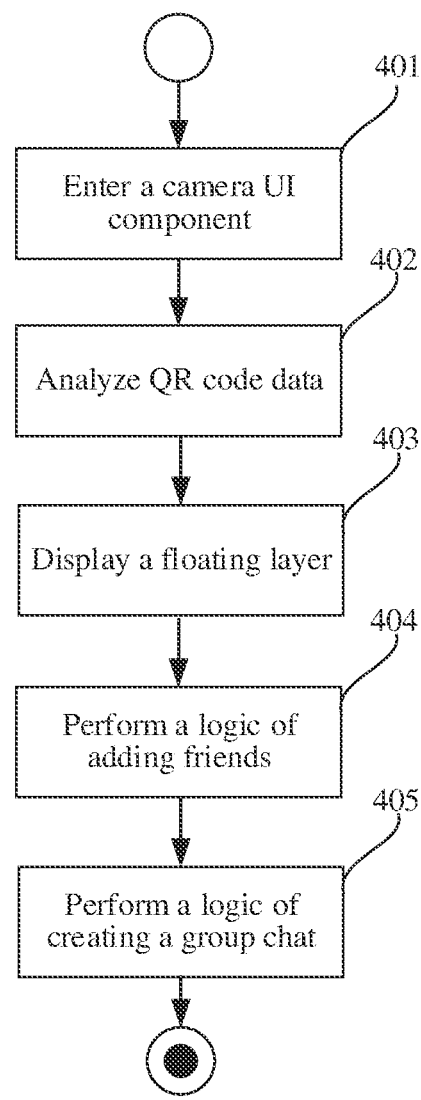
FIG. 32 is a flowchart of a graphic code processing method according to an example embodiment of this application.

In an example example, for a process of scanning the QR codes in a long-press scanning mode in batches, reference may be made to FIG. 32:

S301. Obtain a long image, where
when the user moves a camera, the client loads a plurality of images including the QR codes into memory.

S302. Preprocess images, where
when the user moves the camera, the client further splices the images acquired a plurality of times, and simplifies the complex spliced scanning images with an image processing algorithm such as binarization.

S303. Segment images in batches, where
compared with a recognition process of a single QR code, a plurality of QR codes need to be extracted from the spliced scanning image according to at least three positioning points on each QR code.

S304. Extract contact information in batches, where
the client extracts QR code information corresponding to a piece of contact information from each QR code, and repeats a recognition process of a single QR code a plurality of times, so that the QR code information corresponding to a plurality of pieces of contact information can be extracted in batches. For example, the QR code information is a contact account.

S305. Perform data decoding in batches.
Data decoding is performed on the QR code information corresponding to each piece of contact information to obtain the actual contact information. For example, the client transmits a network request to a backend server through a data protocol provided by the backend server of a social relationship chain to obtain an avatar and a nickname of the contact.

Figure 33:
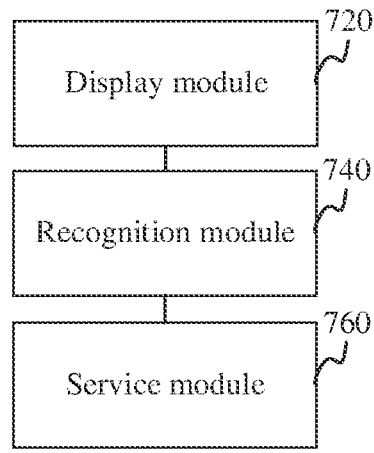
FIG. 33 is a block diagram of a graphic code processing apparatus according to another example embodiment of this application.

In an example example, for a process of adding friends in batches, reference may be made to FIG. 33:

S401. Enter a camera UI component, where
the client displays the graphic code scanning interface by using the camera UI component.

S402. Analyze QR code data, where
through the algorithm for recognizing a plurality of QR codes in batches, all the QR codes acquired in a moving process are obtained in batches, and are cached in the memory. Then, the cached QR codes are decoded in batches to obtain data information after the QR codes are decoded, that is, a plurality of pieces of contact information.

S403. Display a floating layer, where
a half-screen floating window component is used to display the service processing interaction region, and the service processing interaction region displays the avatar and the nickname of the contact. The avatar and the nickname of the contact need to be obtained by the client by transmitting a network request to a backend server through a data protocol provided by the backend server of a social relationship chain. After obtaining the contact information returned by the backend server, the contact information is filled on a UI element in the service processing interaction region.

S404. Perform a logic of adding friends, where
the client invokes a friend adding protocol of the social relationship chain, and carries friend verification information. After the other party receives a friend adding application, a message notification and a red dot reminder are popped up.

S405. Perform a logic of creating a group chat, where
the client invokes the social relationship chain to create a group chat protocol, and transmits the contact information obtained by scanning the QR code to the backend server of the social relationship chain in an aggregating manner. After successfully creating a group chat, the backend server pushes a system message in the form of a small gray bar in the group chat.

FIG. 33 is a block diagram of a graphic code processing apparatus according to an example embodiment of this application. The apparatus includes:

a display module 720, configured to display a graphic code scanning interface, where the graphic code scanning interface is used for previewing at least one frame of execution entity scanning image;

a recognition module or recognition processor 740, configured to obtain n contact accounts in response to n graphic codes recognized in the at least one frame of scanning image, where n is an integer greater than 1; and the display or display module 720, configured to display a service processing interaction region, where the service processing interaction region includes contact controls corresponding to the n contact accounts, and the service processing interaction region is configured to provide a service corresponding to at least one contact account in the n contact accounts.

In an example embodiment of this application, the service processing interaction region further includes: a first service control; and the apparatus further includes:

a service module 760, configured to provide services corresponding to all contact accounts or at least one selected contact account in the n contact accounts in response to a trigger operation on the first service control.

In an example embodiment of this application, the first service control includes: a friend adding control; the service module 760, configured to transmit a friend adding request to all the contact accounts or the at least one contact account in the n contact accounts in response to the trigger operation on the friend adding control; and or transmit a friend adding request to all the contact accounts or the at least one contact account in the n contact accounts and display a chat interface in response to the trigger operation on the friend adding control, where the chat interface is an interface of a local logged-in account conducting a chat session with all the contact accounts or the at least one contact account in the n contact accounts.

In an example embodiment of this application, the first service control includes a group chat inviting control; and the service module 760, configured to display a group chat management interaction region in response to the trigger operation on the group chat inviting control; display a first group chat interface in response to a group chat creation operation on the group chat management interaction region, where the first group chat interface is an interface of a group chat session newly created between a local logged-in account and all the contact accounts or the at least one contact account in the n contact accounts; or display a second group chat interface in response to a group chat selection operation on the group chat management interaction region, where the second group chat interface is an interface inviting all the contact accounts or the at least one contact account in the n contact accounts to join a selected existing group chat session.

In an example embodiment of this application, the first service control includes: a file transmitting control; the service module 760, configured to display at least one candidate file in response to the trigger operation on the file transmitting control; determine a selected file in the at least one candidate file in response to a selection operation on the at least one candidate file; and transmit the selected file to all the contact accounts or the at least one contact account in the n contact accounts in response to a transmission operation.

In an example embodiment of this application, the first service control includes a business card transmitting control; and the service module 760, configured to display at least one candidate contact in response to the trigger operation on the business card transmitting control; determine a target contact in the at least one candidate contact in response to a selection operation on the at least one candidate contact; and transmit an electronic business card of the target contact to all the contact accounts or the at least one contact account in the n contact accounts in response to a transmission operation.

In an example embodiment of this application, the first service control includes a multi-person to-do control; and the service module 760, configured to display a to-do item creation interaction region in response to a trigger operation on the multi-person to-do control; and create to-do items for all the contact accounts or the at least one contact account in the n contact accounts, or create the to-do items for the local logged-in account and all the contact accounts or the at least one contact account in the n contact accounts in response to an editing operation in the to-do item creation interaction region.

In an example embodiment of this application, the first service control includes a multi-person voting control; and the service module 760, configured to display a voting creation interaction region in response to the trigger operation on the multi-person voting control; and create voting items for all the contact accounts or the at least one contact account in the n contact accounts, or create the voting items for the local logged-in account and all the contact accounts or the at least one contact account in the n contact accounts in response to an editing operation in the voting creation interaction region.

In an example embodiment of this application, the first service control includes an online class inviting control; and the service module 760, configured to display at least one candidate online class in response to the trigger operation on the online classroom inviting control; and transmit an invitation request to join a selected online class to all the contact accounts or the at least one contact account in the n contact accounts in response to a selection operation on the at least one candidate online class.

In an example embodiment of this application, the selected contact accounts include:

a contact account selected by a user operation in the n contact accounts;

or a contact account that is not added as a friend in the n contact accounts;

or a contact account in the n contact accounts that meets a screening condition, where the screening condition includes at least one of gender, age, place of birth, occupation, and geographic location.

In an example embodiment of this application, the display module 720 is further configured to display a first graphic code of a local logged-in account; display an adding success message, a contact control of at least one recommended contact account, and a second service control, where the adding success message is a message transmitted after the local logged-in account is successfully added by other contact accounts as a friend by scanning the first graphic code and a second graphic code in batches, the at least one recommended contact account is a contact account corresponding to the second graphic code, and the other contact accounts are contact accounts other than the local logged-in account and the at least one recommended contact account; and determine a selected contact account in response to a selection operation on the contact control of the at least one recommended contact account; and the service module 760 is configured to provide a service corresponding to the selected contact account in response to a trigger operation on the service control.

In an example embodiment of this application, the second service control includes at least one of the friend adding control, the group chat inviting control, the file transmitting control, the business card transmitting control, a multi-person to-do control, a multi-person voting control, an online class inviting control, and an aggregation control, where the aggregation control is a control that displays at least two of the friend adding control, the group chat inviting control, the file transmitting control, the business card transmitting control, the multi-person to-do control, the multi-person voting control, and the online class inviting control in an aggregating manner.

In an example embodiment of this application, the recognition module 740 is configured to perform, in response to the n graphic codes being included on a first scanning image in the at least one frame of scanning image, region segmentation on the first scanning image to obtain image regions corresponding to the n graphic codes; and respectively perform recognition on the graphic codes in the image regions to obtain the n contact accounts.

In an example embodiment of this application, the recognition module 740 is configured to splice at least two frames of scanning images to obtain a spliced scanning image; perform region segmentation on the spliced scanning image to obtain image regions corresponding to the n graphic codes; and respectively perform recognition on the graphic codes in the image regions to obtain the n contact accounts.

In an example embodiment of this application, the graphic code scanning interface includes a code scanning control; and the recognition module 740, configured to splice, in response to a difference between graphic codes on at least two frames of scanning images, the at least two frames of scanning images to obtain the spliced scanning image; or in response to receiving a continuous operation on the code scanning control, splice at least two frames of scanning images acquired during the continuous operation to obtain the spliced scanning image.

In an example embodiment of this application, the graphic code scanning interface includes a code scanning control, and the display module 720 is further configured to display the quantity of recognized graphic codes on the graphic code scanning interface in response to receiving a continuous operation on a code scanning control; and display a service processing interaction region in response to that the continuous operation on the code scanning control ends.

In an example embodiment of this application, the display module 720 is further configured to display the animation effect that the recognized graphic code gradually shrinks and moves to the code scanning control on the graphic code scanning interface.

The graphic code processing apparatus provided in the foregoing embodiments is illustrated with an example of division of the foregoing functional modules. In actual application, the foregoing functions may be assigned to and completed by different function modules as required. That is, an internal structure of the device may be divided into different function modules to complete all or some of the functions described above. In addition, the graphic code processing apparatus provided in the foregoing embodiment belongs to the same idea as the graphic code processing method. For the specific implementation process, reference may be made to the other embodiments.

This application further provides a computer device (a terminal or a server), the computer device includes a processor and a memory, the memory stores at least one instruction, and the at least one instruction is loaded and executed by the processor to implement the graphic code processing method provided in the foregoing method embodiments. The computer device may be a computer device provided in FIG. 34.

Figure 34:
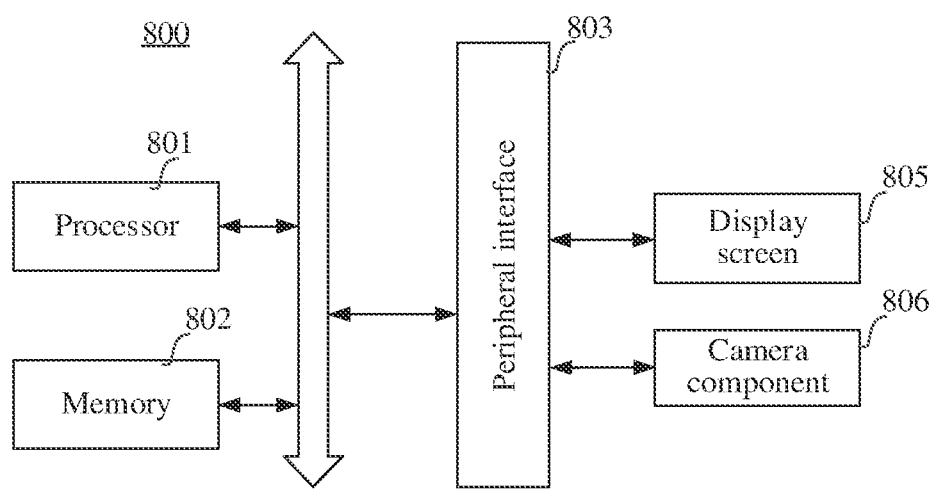
FIG. 34 is a block diagram of a computer device according to another example embodiment of this application.

FIG. 34 is a structural block diagram of a computer device 800 according to an exampleexample embodiment of this application. The computer device 800 may be a smart phone, a tablet computer, a Moving Picture Experts Group Audio Layer III (MP3) player, a Moving Picture Experts Group Audio Layer IV (MP4) player, a notebook computer, or a desktop computer. The computer device 800 may also be referred to as other names such as user equipment, a portable computer device, a laptop computer device, and a desktop computer device.

Generally, the computer device 800 includes a processor 801 and a memory 802.

The processor 801 may include one or more processing cores, for example, a 4-core processor or an 8-core processor. The processor 801 may be implemented in at least one hardware form of a digital signal processor (DSP), a field-programmable gate array (FPGA), and a programmable logic array (PLA). The processor 801 may also include a main processor and a coprocessor. The main processor is a processor configured to process data in an awake state, and is also referred to as a central processing unit (CPU). The coprocessor is a low power consumption processor configured to process the data in a standby state. In some embodiments, a graphics processing unit (GPU) may be integrated into the processor 801. The GPU is configured to be responsible for rendering and drawing content to be displayed on a display screen. In some embodiments, the processor 801 may further include an artificial intelligence (AI) processor. The AI processor is configured to process computing operations related to machine learning.

The memory 802 may include one or more computer-readable storage media. The computer-readable storage medium may be non-transient. The memory 802 may further include a high-speed random access memory and a nonvolatile memory, for example, one or more disk storage devices or flash storage devices. In some embodiments, the non-transitory computer-readable storage medium in the memory 802 is configured to store at least one instruction, and the at least one instruction is configured to be executed by the processor 801 to implement the graphic code processing method provided in the method embodiments of this application.

The display screen 805 is configured to display a user interface (UI). The UI may include a graph, a text, an icon, a video, and any combination thereof. When the display screen 805 is a touch display screen, the display screen 805 is further capable of collecting touch signals on or above a surface of the display screen 805. The touch signal may be inputted, as a control signal, to the processor 801 for processing. In this case, the display screen 805 may be further configured to provide a virtual button and/or a virtual keyboard, which is also referred to as a soft button and/or a soft keyboard. In some embodiments, there is one display screen 805, disposed on a front panel of the computer device 800. In some other embodiments, there may be at least two display screens 805, respectively disposed on different surfaces of the computer device 800 or designed in a foldable shape. In still some other embodiments, the display screen 805 may be a flexible display screen, disposed on a curved surface or a folded surface of the computer device 800. Even, the display screen 805 may also be set to a non-rectangular irregular pattern, that is, a special-shaped screen.

The display screen 805 may be made of a material such as a liquid crystal display (LCD) or an organic light-emitting diode (OLED).

The camera component 806 is configured to collect images or videos. In some embodiments, the camera assembly 806 includes a front-facing camera and a rear-facing camera. Generally, the front-facing camera is disposed on the front panel of the computer device, and the rear-facing camera is disposed on a back face of the computer device. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and VR shooting functions through fusion of the main camera and wide-angle camera, or another fusion shooting function. In some embodiments, the camera 806 may further include a flash. The flash may be a monochrome temperature flash, or may be a double color temperature flash. The double color temperature flash refers to a combination of a warm light flash and a cold light flash, and may be used for light compensation under different color temperatures.

A person skilled in the art may understand that the structure shown in FIG. 34 does not constitute any limitation on the computer device 800, and the computer device may include more components or fewer components than those shown in the figure, or some components may be combined, or a different component deployment may be used.

The memory further includes one or more programs. The one or more programs are stored in the memory and include the graphic code processing method provided in the embodiments of this application.

This application provides a computer-readable storage medium, the storage medium storing at least one instruction, and the at least one instruction being loaded and executed by a processor to implement the graphic code processing method according to the foregoing method embodiments.

This application further provides a computer program product, the computer program product, when run on a computer, causing the computer to implement the graphic code processing method according to the foregoing method embodiments.

The sequence numbers of the foregoing embodiments of this application are merely for description purpose, and are not intended to indicate the preference among the embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A graphic code processing method comprising:
    displaying a graphic code scanning interface that is used for previewing at least one frame of an acquired scanning image;
    performing, in response to n graphic codes being comprised in the at least one frame of scanning image, recognition on the n graphic codes to obtain n contact accounts, wherein n is an integer greater than 1;
    displaying a service processing interaction region that comprises contact controls corresponding to the n contact accounts, wherein the service processing interaction region is used for providing a service corresponding to at least one contact account in the n contact accounts;
    displaying a first graphic code of a local logged-in account; and
    displaying an adding success message and a contact control of at least one recommended contact account, wherein the adding success message is a message transmitted after the local logged-in account is successfully added by other contact accounts as a friend by scanning the first graphic code and a second graphic code in batches, wherein each of the at least one recommended contact account is a contact account corresponding to the second graphic code, and the other contact accounts are contact accounts other than the local logged-in account and the at least one recommended contact account.

2. The method according to claim 1, wherein the service processing interaction region further comprises a first service control; and the method further comprises:
    providing services corresponding to all contact accounts or at least one selected contact account in the n contact accounts in response to a trigger operation on the first service control.

3. The method according to claim 2, wherein the first service control comprises a friend adding control; and the providing further comprises:
    transmitting a friend adding request to all the contact accounts or the at least one contact account accounts in the n contact accounts in response to the trigger operation on the friend adding control; or
    transmitting a friend adding request to all the contact accounts or the at least one contact account in the n contact accounts and displaying a chat interface in response to the trigger operation on the friend adding control, wherein the chat interface is an interface of a local logged-in account conducting a chat session with all the contact accounts or the at least one contact account in the n contact accounts.

4. The method according to claim 2, wherein the first service control comprises a group chat inviting control; and the providing further comprises:
    displaying a group chat management interaction region in response to the trigger operation on the group chat inviting control;
    displaying a first group chat interface in response to a group chat creation operation on the group chat management interaction region, wherein the first group chat interface is an interface of a group chat session newly created between a local logged-in account and all or selected contact accounts in the n contact accounts; or
    displaying a second group chat interface in response to a group chat selection operation on the group chat management interaction region, wherein the second group chat interface is an interface inviting all the contact accounts or the at least one contact account in the n contact accounts to join a selected existing group chat session.

5. The method according to claim 2, wherein the first service control comprises a file transmitting control; and the providing further comprises:

displaying at least one candidate file in response to the trigger operation on the file transmitting control;

determining a selected file in the at least one candidate file in response to a selection operation on the at least one candidate file; and transmitting the selected file to all the contact accounts or the at least one contact account in the n contact accounts in response to a transmission operation.

6. The method according to claim 2, wherein the first service control comprises a business card transmitting control; and the providing further comprises:

displaying at least one candidate contact in response to the trigger operation on the business card transmitting control;

determining a target contact in the at least one candidate contact in response to a selection operation on the at least one candidate contact; and transmitting an electronic business card of the target contact to all the contact accounts or the at least one contact account in the n contact accounts in response to a transmission operation.

7. The method according to claim 2, wherein the selected contact accounts comprise:

a contact account selected by a user operation in the n contact accounts;

a contact account that is not added as a friend in the n contact accounts; or a contact account in the n contact accounts that meets a screening condition, wherein the screening condition comprises at least one of gender, age, place of birth, occupation, and geographic location.

8. The method according to claim 1, wherein the displaying the adding success message and the contact control of the at least one recommended contact account comprises:

displaying the adding success message, the contact control of the at least one recommended contact account, and a second service control; and the method further comprises:

determining a selected contact account in response to a selection operation on the contact control of the at least one recommended contact account; and providing a service corresponding to the selected contact account in response to a trigger operation on the second service control.

9. The method according to claim 8, wherein the second service control comprises at least one of the friend adding control, the group chat inviting control, the file transmitting control, the business card transmitting control, a multi-person to-do control, a multi-person voting control, an online class inviting control, or an aggregation control, wherein the aggregation control comprises a control that displays at least two of the friend adding control, the group chat inviting control, the file transmitting control, the business card transmitting control, the multi-person to-do control, the multi-person voting control, and the online class inviting control in an aggregating manner.

10. The method according to claim 1, wherein the in response to n graphic codes being comprised in the at least one frame of scanning image, performing recognition on the n graphic codes to obtain n contact accounts comprises:

performing, in response to the n graphic codes being comprised on a first scanning image in the at least one frame of scanning image, region segmentation on the first scanning image to obtain image regions corresponding to the n graphic codes; and respectively performing recognition on the graphic codes in the image regions to obtain the n contact accounts.

11. The method according to claim 1, wherein the performing in response to n graphic codes further comprises:

splicing at least two frames of scanning images to obtain a spliced scanning image;

performing region segmentation on the spliced scanning image to obtain image regions corresponding to the n graphic codes; and performing recognition on the graphic codes in the image regions to obtain the n contact accounts.

12. The method according to claim 11, wherein the graphic code scanning interface comprises a code scanning control; and the splicing further comprises:

splicing, in response to a difference between graphic codes on at least two frames of scanning images, the at least two frames of scanning images to obtain the spliced scanning image; or splicing, in response to receiving a continuous operation on the code scanning control, at least two frames of scanning images acquired during the continuous operation to obtain the spliced scanning image.

13. The method according to claim 1, wherein the service processing interaction region further comprises a first service control; and the method further comprises:

providing services corresponding to all contact accounts or at least one selected contact account in the n contact accounts in response to a trigger operation on the first service control.

14. The method according to claim 13, wherein the first service control comprises a multi-person to-do control; and the providing services corresponding to all contact accounts further comprises:

displaying a to-do item creation interface in response to a fifth trigger operation on the multi-person to-do control; and creating to-do items for all the contact accounts or the at least one contact account in the n contact accounts, or creating to-do items for a local logged-in account and all the or the selected contact accounts in the n contact accounts in response to a first editing operation on the to-do item creation interface.

15. The method according to claim 13, wherein the first service control comprises a multi-person voting control; and the providing services corresponding to all contact accounts further comprises:

displaying a voting creation interface in response to a sixth trigger operation on the multi-person voting control; and creating voting items for all the contact accounts or the at least one contact account in the n contact accounts, or creating voting items for a local logged-in account and all the contact accounts or the at least one contact account in the n contact accounts in response to a second editing operation on the voting creation interface.

16. The method according to claim 13, wherein the first service control comprises an online class inviting control; and the providing services corresponding to all contact accounts further comprises:

displaying an online class selection interface in response to a seventh trigger operation on the online class inviting control, wherein the online class selection interface displays at least one candidate online class and a determining control; and transmitting an invitation request to join a selected online class to all the contact accounts or the at least one contact account in the n contact accounts in response to a third selection operation on the at least one candidate online class.

17. A graphic code processing apparatus, comprising:
a display;
a graphic code scanning interface displayed on the display and used for previewing at least one frame of acquired scanning image; and
a recognition processor, configured to obtain n contact accounts in response to n graphic codes recognized in the at least one frame of scanning image, n being an integer greater than 1;
wherein the display is further configured to:
    display a service processing interaction region, the service processing interaction region comprising contact controls corresponding to the n contact accounts, and the service processing interaction region being used for providing a service corresponding to at least one contact account in the n contact accounts;
    display a first graphic code of a local logged-in account; and
    display an adding success message and a contact control of at least one recommended contact account, wherein the adding success message is a message transmitted after the local logged-in account is successfully added by other contact accounts as a friend by scanning the first graphic code and a second graphic code in batches, wherein each of the at least one recommended contact account is a contact account corresponding to the second graphic code, and the other contact accounts are contact accounts other than the local logged-in account and the at least one recommended contact account.

18. A non-transitory computer-readable storage medium, storing at least one instruction, at least one program, a code set, or an instruction set that is loaded and executed by a processor to implement:
    displaying a graphic code scanning interface that is used for previewing at least one frame of an acquired scanning image;
    performing, in response to n graphic codes being comprised in the at least one frame of scanning image, recognition on the n graphic codes to obtain n contact accounts, wherein n is an integer greater than 1;
    displaying a service processing interaction region that comprises contact controls corresponding to the n contact accounts, wherein the service processing interaction region is used for providing a service corresponding to at least one contact account in the n contact accounts;
    displaying a first graphic code of a local logged-in account; and
    displaying an adding success message and a contact control of at least one recommended contact account, wherein the adding success message is a message transmitted after the local logged-in account is successfully added by other contact accounts as a friend by scanning the first graphic code and a second graphic code in batches, wherein each of the at least one recommended contact account is a contact account corresponding to the second graphic code, and the other contact accounts are contact accounts other than the local logged-in account and the at least one recommended contact account.

19. The computer-readable storage medium of claim 18, wherein the service processing interaction region further comprises a first service control and the processor is configured to implement:
    providing services corresponding to all contact accounts or at least one selected contact account in the n contact accounts in response to a trigger operation on the first service control.

20. The computer-readable storage medium of claim 18, wherein the processor is configured to implement:
    displaying a first graphic code of a local logged-in account;
    displaying an adding success message, a contact control of at least one recommended contact account, and a second service control, wherein the adding success message is a message transmitted after the local logged-in account is successfully added by other contact accounts as a friend by scanning the first graphic code and a second graphic code in batches, wherein each of the at least one recommended contact account is a contact account corresponding to the second graphic code, and the other contact accounts are contact accounts other than the local logged-in account and the at least one recommended contact account;
    determining a selected contact account in response to a selection operation on the contact control of the at least one recommended contact account; and
    providing a service corresponding to the selected contact account in response to a trigger operation on the second service control.

* * * * *